(12) United States Patent
Doczy et al.

(10) Patent No.: US 8,446,359 B2
(45) Date of Patent: May 21, 2013

(54) INSTRUMENT-ACTIVATED SUB-SURFACE COMPUTER BUTTONS AND SYSTEM AND METHOD INCORPORATING SAME

(75) Inventors: Paul J. Doczy, Cypress, TX (US); Stacy Wolff, Cypress, TX (US); Steven S. Homer, Tomball, TX (US); Mark C. Solomon, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1720 days.

(21) Appl. No.: 10/160,201

(22) Filed: May 31, 2002

(65) Prior Publication Data

US 2003/0221876 A1    Dec. 4, 2003

(51) Int. Cl.
*G09G 5/00* (2006.01)
*G09G 3/22* (2006.01)
*G06F 3/033* (2006.01)

(52) U.S. Cl.
USPC .................. 345/156; 345/179; 345/183

(58) Field of Classification Search
USPC .............. 345/169, 173, 183, 180, 156, 179
See application file for complete search history.

(56) References Cited

U.S. PATENT DOCUMENTS

| | | | | |
|---|---|---|---|---|
| 3,757,322 A * | 9/1973 | Barkan et al. | ................. | 345/174 |
| 4,672,154 A * | 6/1987 | Rodgers et al. | ............ | 178/19.07 |
| 4,730,186 A * | 3/1988 | Koga et al. | ..................... | 345/179 |
| 5,049,862 A * | 9/1991 | Dao et al. | ....................... | 345/179 |
| 5,067,573 A * | 11/1991 | Uchida | .......................... | 345/173 |
| 5,177,328 A * | 1/1993 | Ito et al. | ..................... | 178/18.03 |
| 5,180,891 A * | 1/1993 | Trumbo | ..................... | 178/19.01 |
| 5,231,381 A * | 7/1993 | Duwaer | ........................ | 345/174 |
| 5,369,227 A * | 11/1994 | Stone | .......................... | 178/19.07 |
| 5,389,745 A * | 2/1995 | Sakamoto | .................. | 178/18.03 |
| 5,444,192 A * | 8/1995 | Shetye et al. | ............. | 178/18.09 |
| 5,528,266 A * | 6/1996 | Arbeitman et al. | ........... | 345/173 |
| 5,534,893 A * | 7/1996 | Hansen et al. | ................ | 345/179 |
| 5,555,157 A * | 9/1996 | Moller et al. | ................. | 361/683 |
| 5,589,856 A * | 12/1996 | Stein et al. | ..................... | 345/173 |
| 5,734,130 A * | 3/1998 | Baker | ........................ | 178/18.07 |
| 5,889,237 A * | 3/1999 | Makinwa | .................... | 178/18.01 |
| 6,166,734 A * | 12/2000 | Nahi et al. | .................... | 715/748 |
| 6,184,863 B1 * | 2/2001 | Sibert et al. | .................... | 345/156 |
| 6,259,043 B1 * | 7/2001 | Clary et al. | ................ | 178/18.01 |
| 6,295,372 B1 * | 9/2001 | Hawkins et al. | ............... | 382/187 |
| 6,504,526 B1 * | 1/2003 | Mauritz | ........................ | 345/158 |
| 6,507,336 B1 * | 1/2003 | Lunsford | ...................... | 345/168 |
| 6,661,399 B1 * | 12/2003 | Oh et al. | .......................... | 345/87 |
| 6,724,372 B1 * | 4/2004 | Bi et al. | ........................ | 345/179 |
| 6,727,894 B1 * | 4/2004 | Karidis et al. | ................ | 345/174 |
| 6,788,285 B2 * | 9/2004 | Paolucci et al. | ............... | 345/156 |
| 6,906,701 B1 * | 6/2005 | Oueslati et al. | ............... | 345/170 |
| 7,113,173 B1 * | 9/2006 | Bi et al. | ........................ | 345/169 |
| 2002/0164976 A1 * | 11/2002 | Chen et al. | .................... | 455/414 |

* cited by examiner

*Primary Examiner* — M Good Johnson

(57) ABSTRACT

The present technique provides a system and method for providing instrument-activated buttons having a sub-surface mechanism for triggering a desired function upon interaction with an above-surface electronic/digital user device, such as a digitizing pointing device. The instrument-activated buttons may be disposed in a display device, a tablet computing device, or any other suitable electronic device. A user navigates a housing surface of the electronic device until a signal identifies the sub-surface button, which may then be activated by performing an instrument-based activation event. The activation event may be a button click, a tip movement, or any other suitable trigger on the electronic/digital user device. A wireless communication is then transmitted between the sub-surface mechanism and the electronic/digital user device to initiate the function associated with the instrument-activated button.

17 Claims, 24 Drawing Sheets

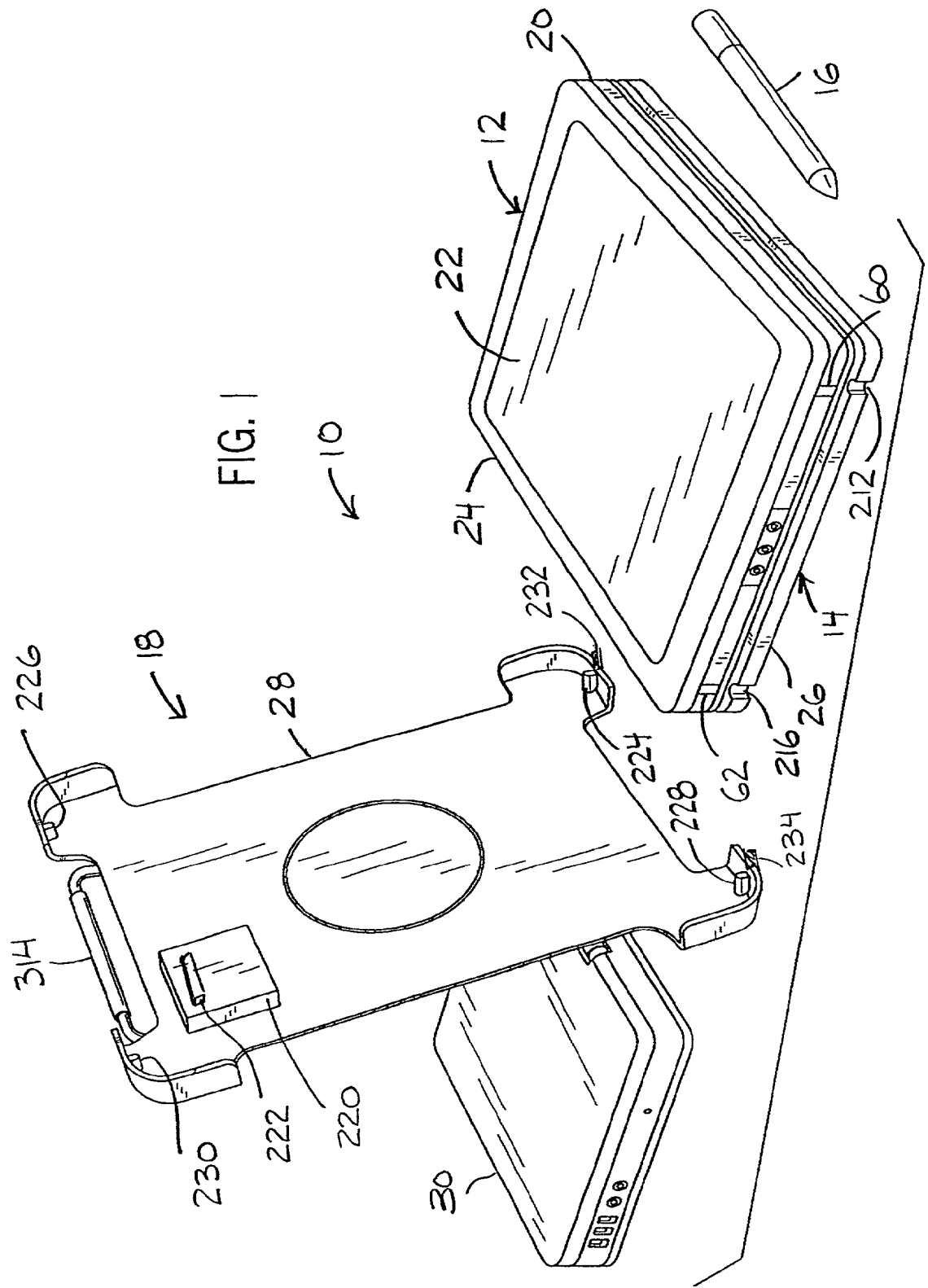

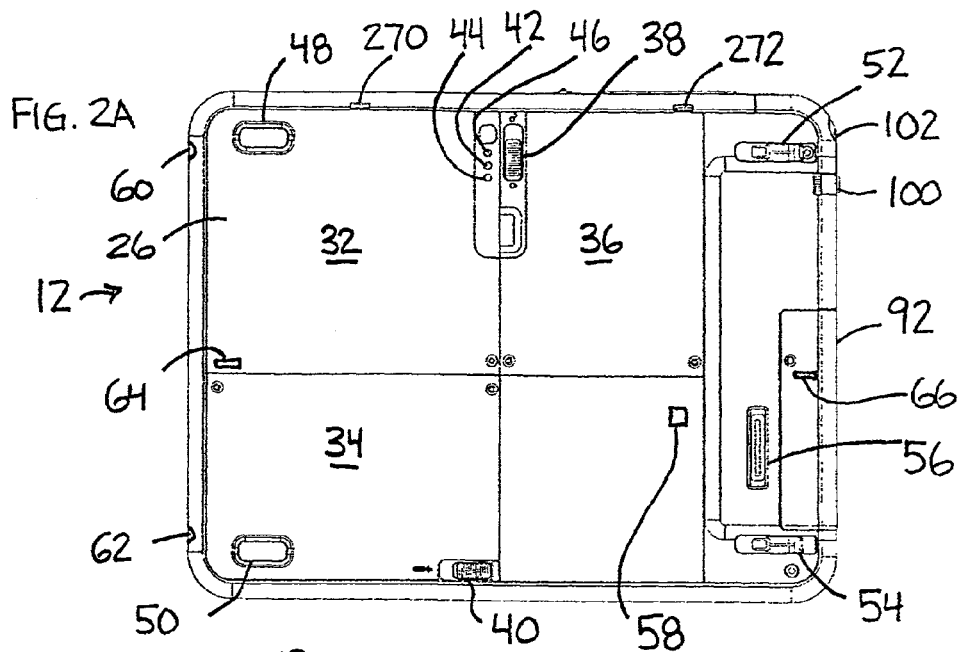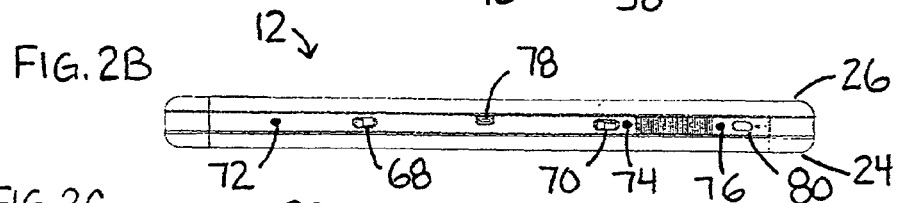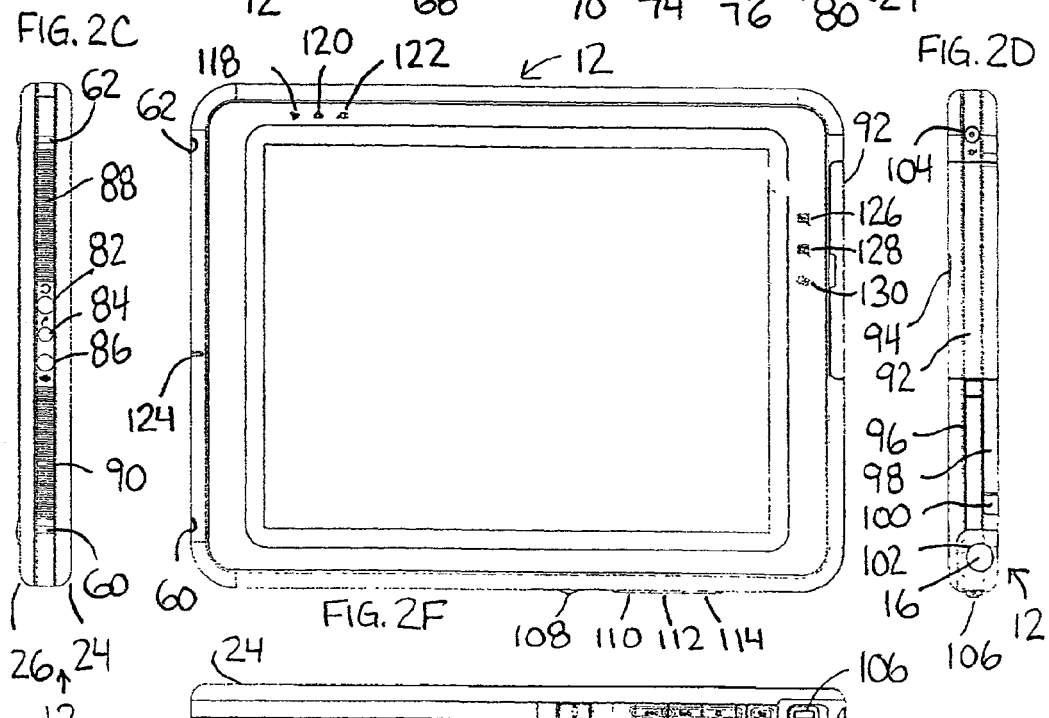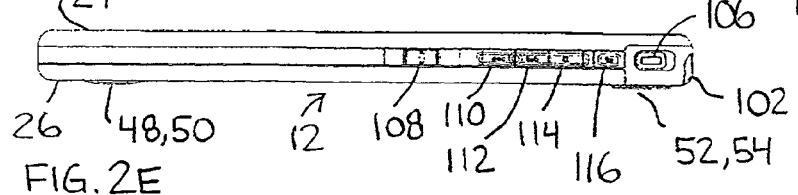

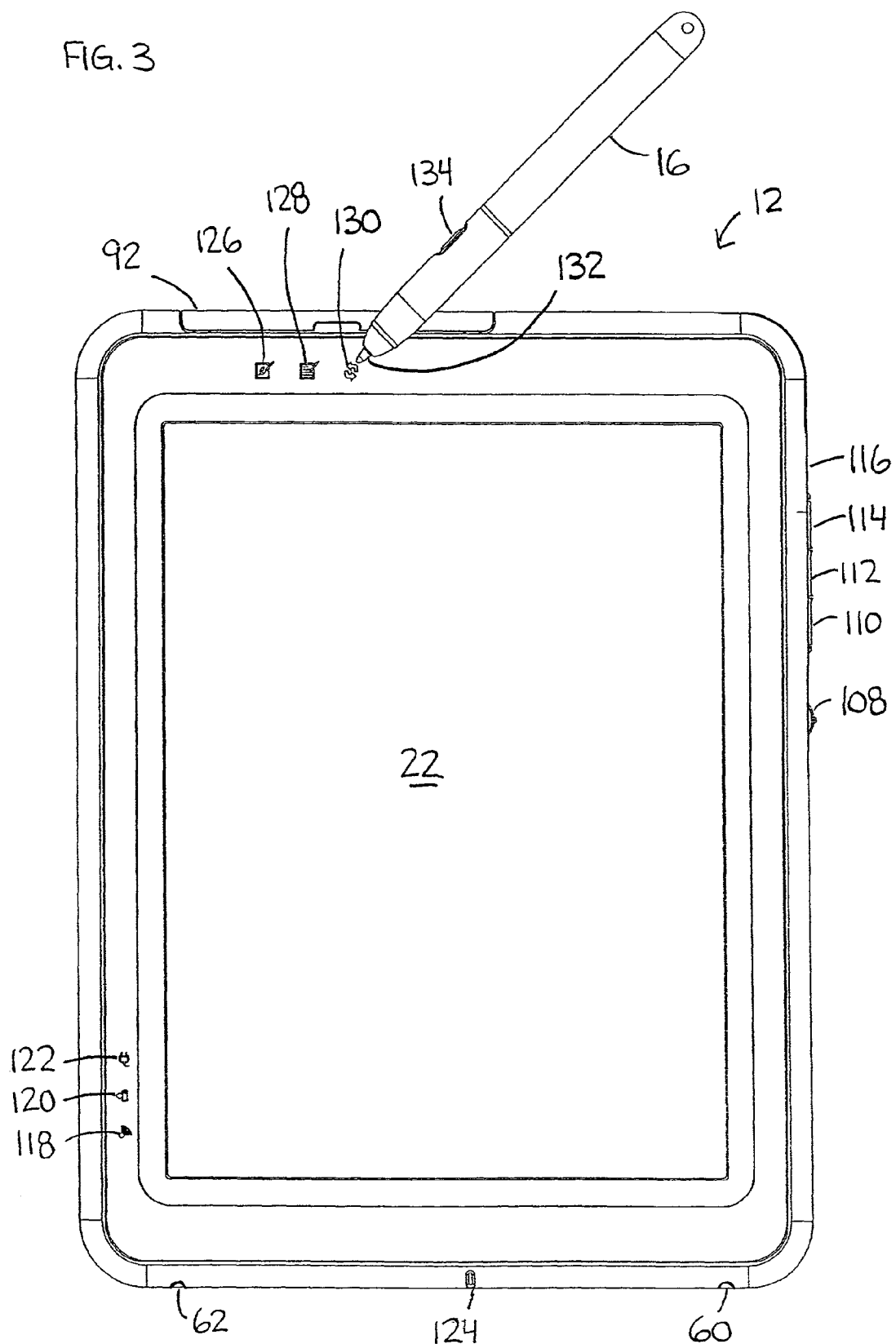

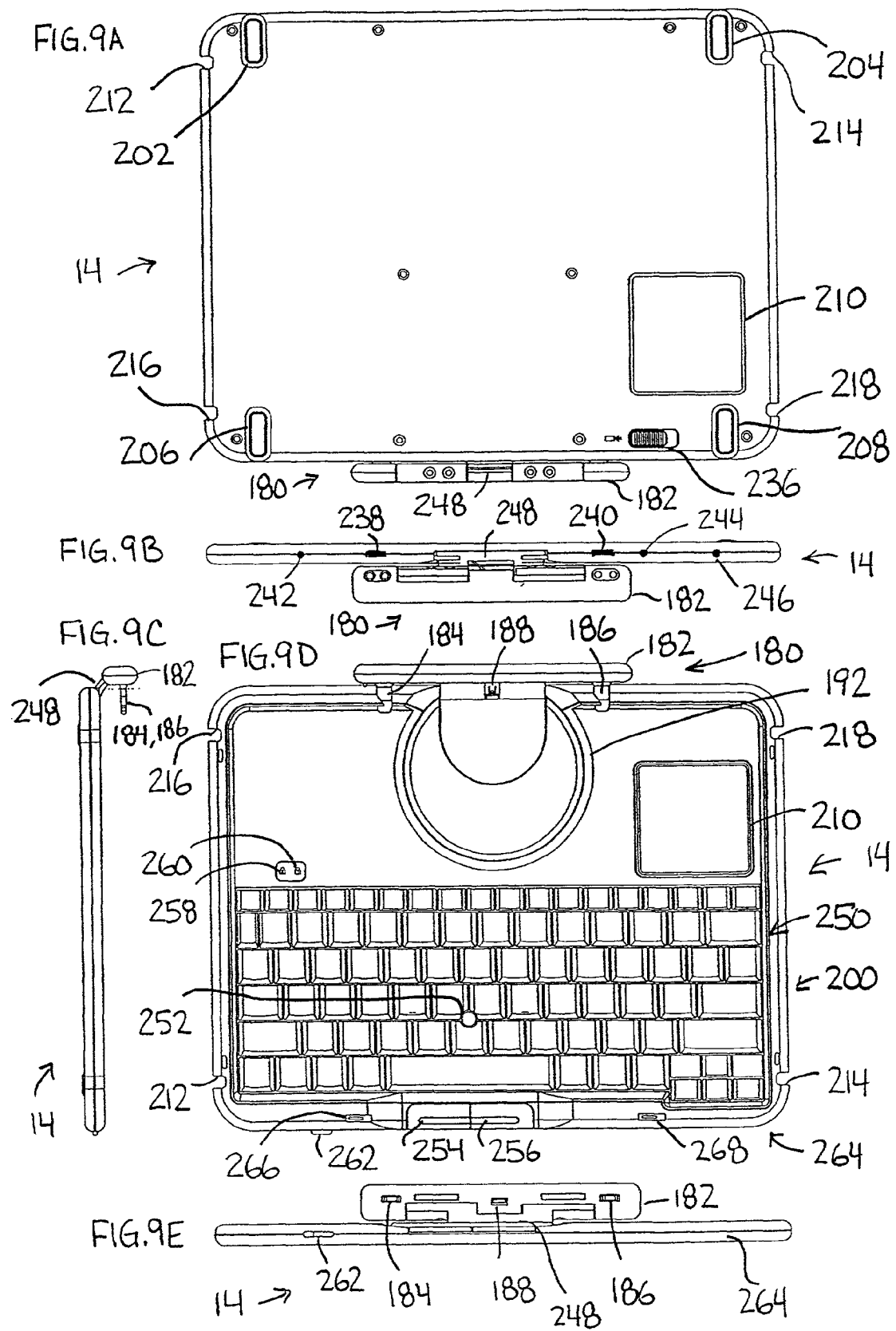

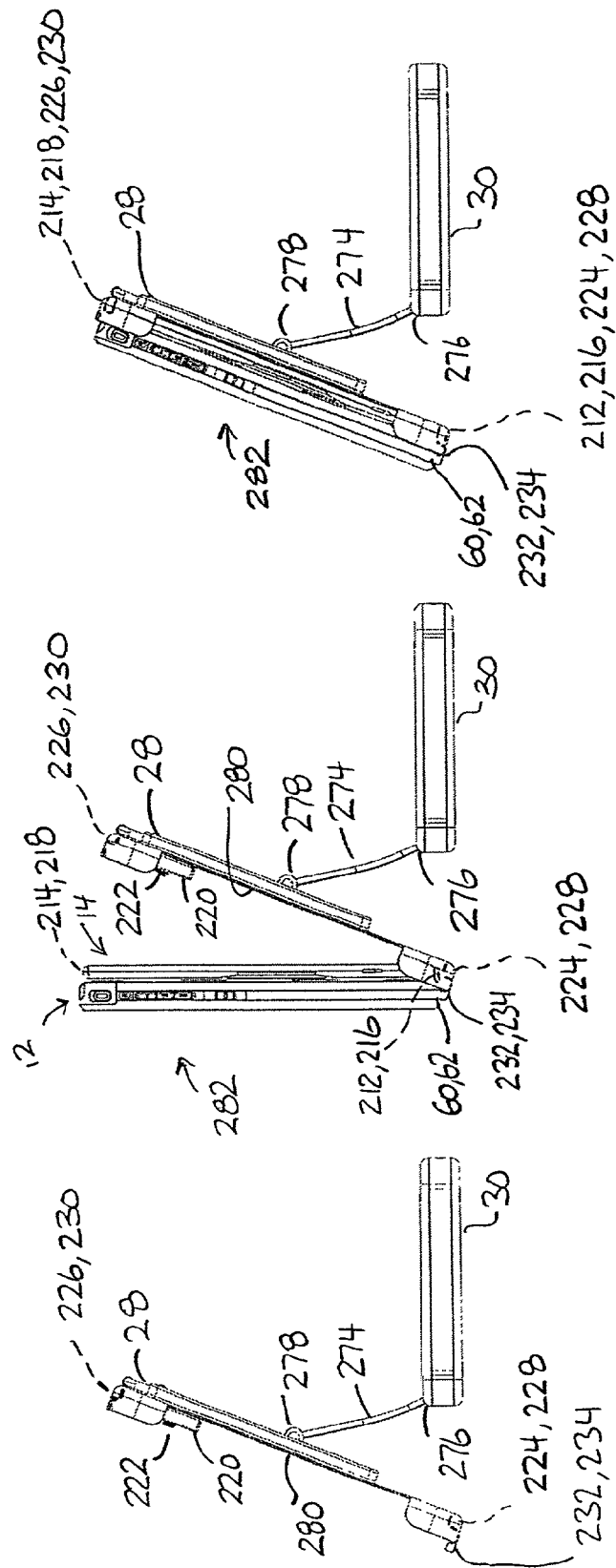

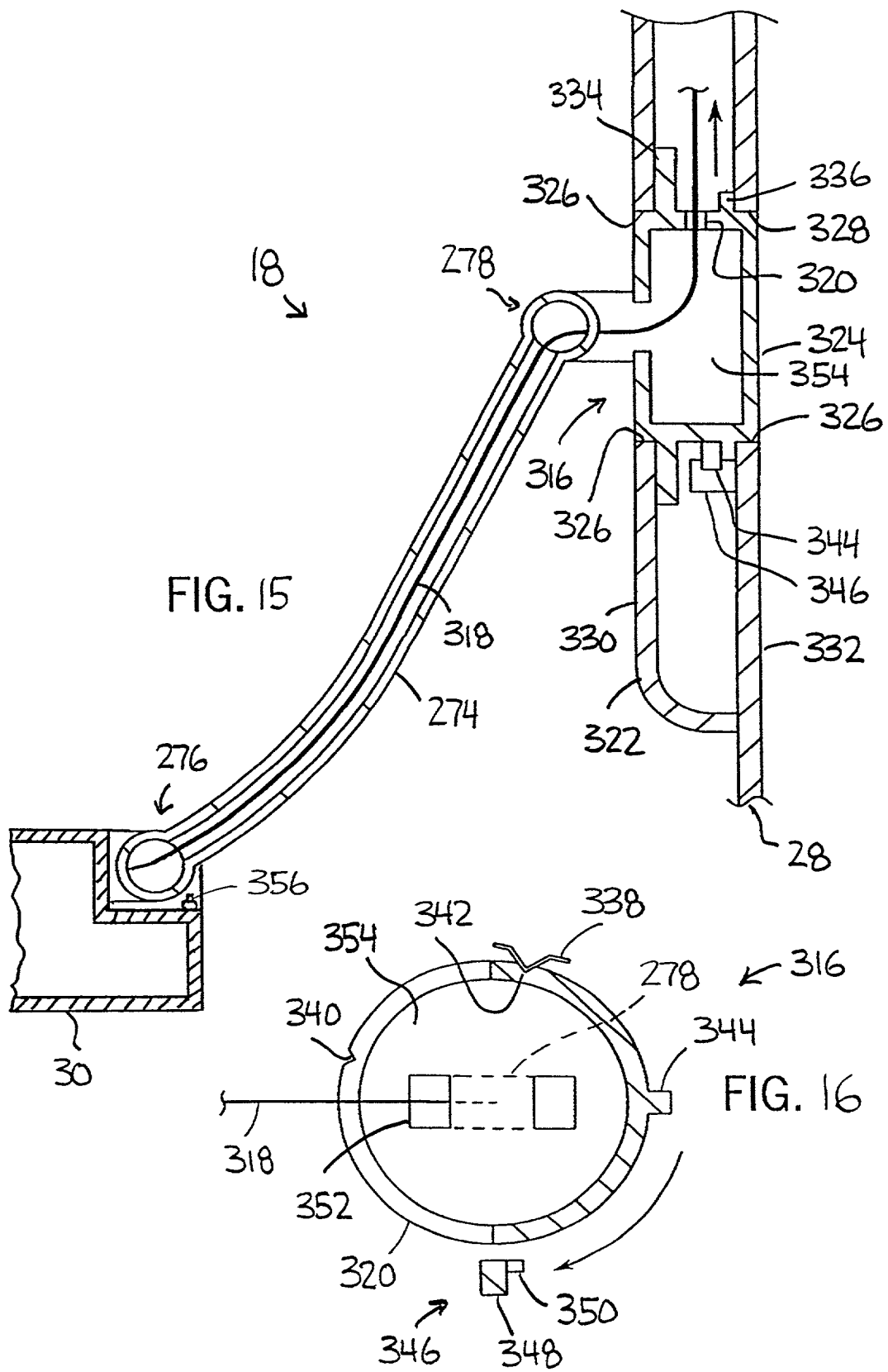

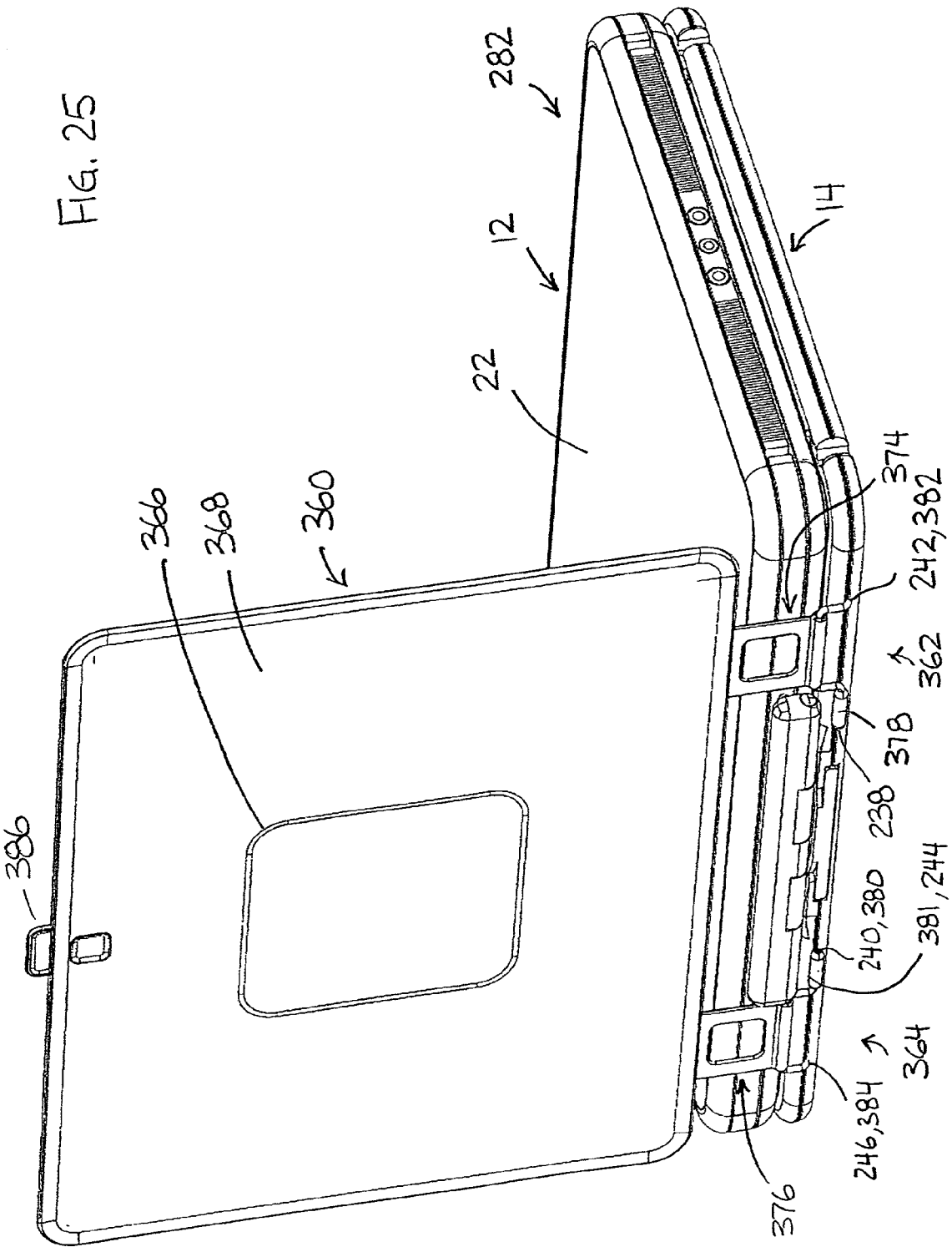

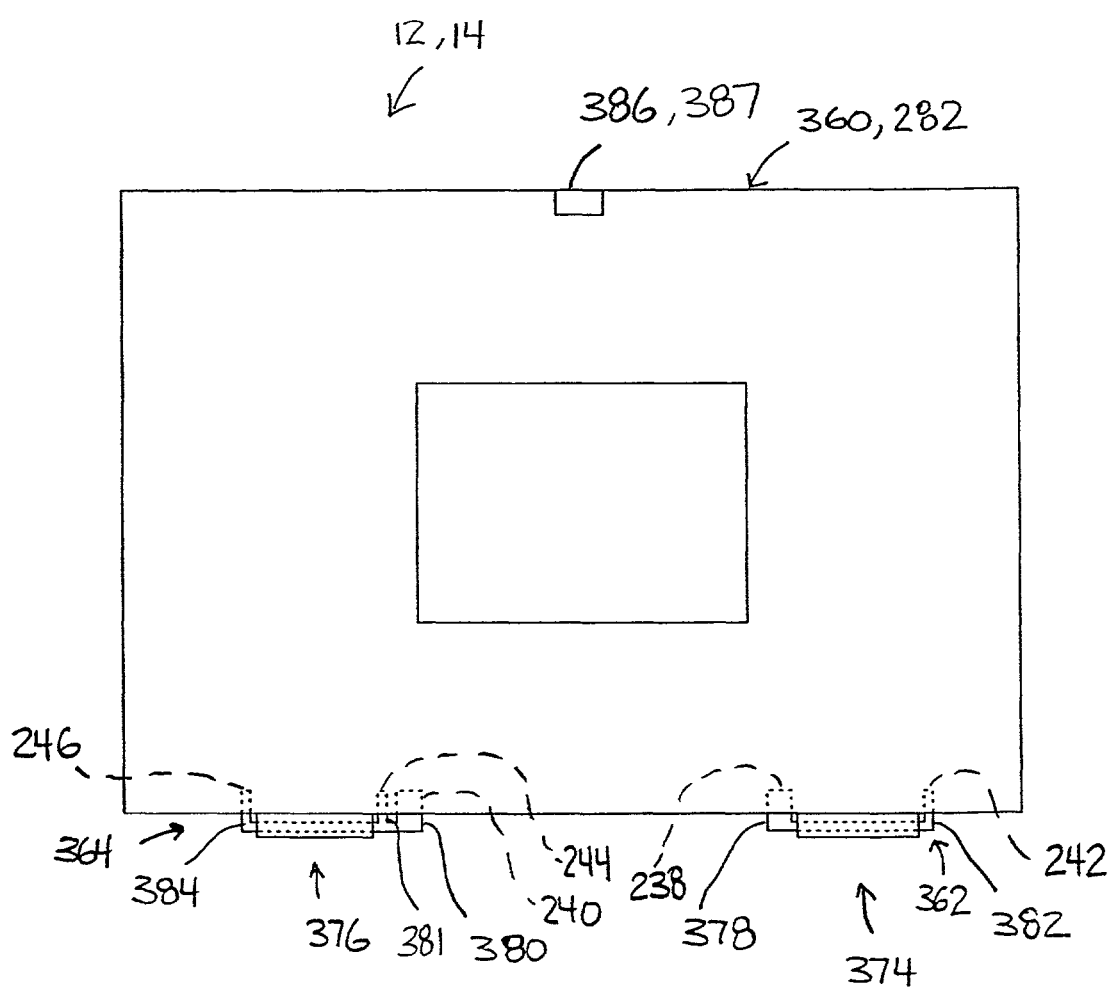

INSTRUMENT-ACTIVATED SUB-SURFACE COMPUTER BUTTONS AND SYSTEM AND METHOD INCORPORATING SAME

FIELD OF THE INVENTION

The present technique relates generally to computer systems and, more particularly, to user input buttons for a portable computing device. The present technique provides a system and method for providing instrument-activated buttons having a sub-surface mechanism for triggering a desired function upon interaction with an above-surface electronic/digital user device, such as a digitizing pointing device.

BACKGROUND OF THE INVENTION

Computer systems and other electronic devices often have one or more buttons to initiate a desired function. For example, computer systems generally have a keyboard, a number keypad, and a plurality of special function buttons. All of these buttons are activated by physical contact, such as a vertical displacement by a fingertip. In portable computers and electronics, buttons are relatively vulnerable to accidental physical contact due to the compact dimensions of the devices and, also, due to the relatively small size and tightly packed arrangement of the buttons. In many portable computer systems, system critical buttons are disposed in a recess, a slot, or an area remote from the user input devices (e.g., keyboard). For example, a system reset button may be recessed within a small slot, such as a pen hole. However, these system buttons remain vulnerable to accidental physical contact.

SUMMARY OF THE INVENTION

The present technique provides a system and method for providing instrument-activated buttons having a sub-surface mechanism for triggering a desired function upon interaction with an above-surface electronic/digital user device, such as a digitizing pointing device. The instrument-activated buttons may be disposed in a display device, a tablet computing device, or any other suitable electronic device. A user navigates a housing surface of the electronic device until a signal identifies the sub-surface button, which may then be activated by performing an instrument-based activation event. The activation event may be a button click, a tip movement, or any other suitable trigger on the electronic/digital user device. A wireless communication is then transmitted between the sub-surface mechanism and the electronic/digital user device to initiate the function associated with the instrument-activated button.

BRIEF DESCRIPTION OF THE DRAWINGS

Exemplary embodiments will hereafter be described with reference to the accompanying drawings, wherein like reference numerals denote like elements, and:

FIG. 1 is a perspective view of an exemplary tablet computer system having a tablet computing device, a multi-attachable keyboard, a digitizing pointing device, and a multi-configurable docking assembly;

FIG. 2a is a bottom view of the tablet computing device;

FIGS. 2b-2e are side views of the tablet computing device;

FIG. 2f is a top view of the tablet computing device;

FIG. 3 is a top view of the tablet computing device illustrating interaction between the digitizing pointing device and one of multiple digitizer buttons within the tablet computing device;

FIG. 9a is a bottom view of the multi-attachable keyboard;

FIGS. 9b, 9c, and 9e are side views of the multi-attachable keyboard;

FIG. 9d is a top view of the multi-attachable keyboard;

FIGS. 11a-11c are side views illustrating an exemplary tablet-keyboard docking process for docking a tablet-keyboard assembly of the tablet computing device and the multi-attachable keyboard with the multi-configurable docking assembly;

FIG. 15 is a partial cross-sectional side view illustrating the rotational adjustment assembly and hinge/clutch assemblies of an orientation adjustment arm for the multi-configurable docking assembly;

FIG. 16 is a partial cross-sectional face view of the rotational adjustment assembly illustrated by FIG. 15;

FIG. 25 is a perspective view of the protective display cover releasably mounted to the tablet-keyboard assembly via the reversible coupling structures; and FIG. 26 is a top view of the protective display cover releasably mounted to the tablet-keyboard assembly.

DETAILED DESCRIPTION OF SPECIFIC EMBODIMENTS

Figure 4:
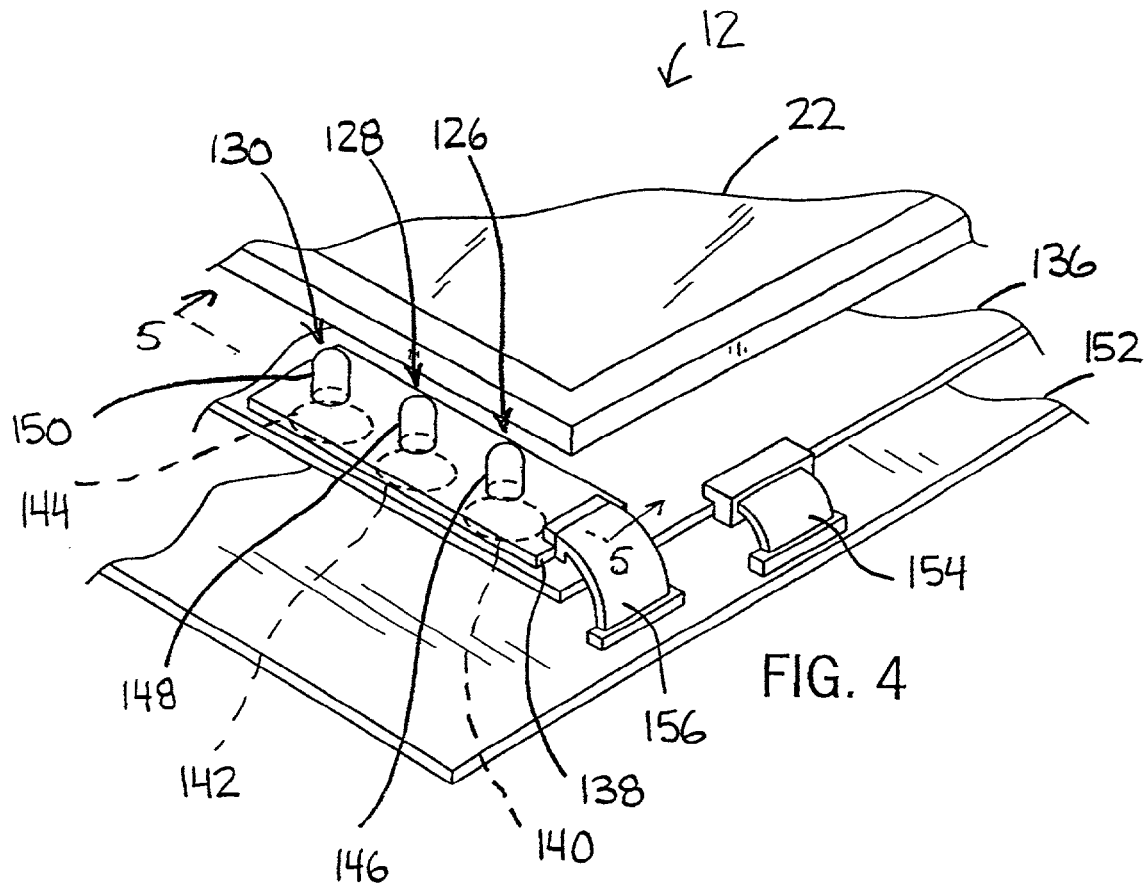
FIG. 4 is a partial internal perspective view of the tablet computing device illustrating a digitizer assembly for the digitizer buttons illustrated by FIG. 3.

The present technique is directed toward a tablet computer system and, more specifically, systems and methods for automatically switching viewing orientations of a display in response to physical rotation of the display. FIG. 1 is a perspective view of an exemplary tablet computer system 10 of the present technique. In this exemplary embodiment, the tablet computer system 10 comprises a tablet computing device 12, a multi-attachable keyboard 14, a digitizing pointing device 16, and a multi-configurable docking assembly 18. The foregoing components are intended to provide a relatively flexible and multi-configurable computing system, which allows multiple angular, elevational, and orientational positions of the various components of the table computing system 10. Accordingly, a user may select the desired components and adapt the tablet computing system 10 to a desired environment, such as a variety of home, work, and mobile environments. Although not illustrated, the tablet computer system 10 also may comprise a variety of additional components and peripherals, such as a printer, a scanner, a digital camera, an external monitor, and various other input/output devices.

As illustrated, the tablet computing device 12 has a housing 20, which has a display screen assembly 22 disposed in a top side 24 of the housing 20, a plurality of computing components and circuitry disposed within the housing 20, and the multi-attachable keyboard 14 removably coupled to a bottom side 26 of the housing 20. The display screen assembly 22 may comprise any suitable flat panel display screen technology, including a variety of screen enhancement, antireflective, protective, and other layers. The display screen assembly 22 also may have touch panel technology, digitizer panel technology, and various other user-interactive screen technologies. As discussed in detail below, the digitizing pointing device 16 interacts with a digitizing panel disposed in the top side 24 of the tablet computing device 12. The digitizing panel may be disposed below, within, or adjacent the display screen assembly 22. In this exemplary embodiment, the digitizer panel extends to a peripheral area of the display screen assembly 22, where the tablet computing device 12 defines digitizer-activated buttons for desired computing functions. The tablet computing device 12 also may comprise a variety of user interaction circuitry and software, such as speech-to-text conversion software (i.e., voice recognition) and writing-to-text conversion software (e.g., for the digitizing pointing device 16). Accordingly, a user may interact with the tablet computing device 12 without a conventional keyboard or mouse.

The computing components disposed within the tablet style housing 20 may comprise a processor, a motherboard, volatile and nonvolatile memory (e.g., a hard drive, RAM, ROM, flash memory, cache memory, etc.), network circuitry (e.g., a modem, a network card, etc.), wireless communications circuitry (e.g., IR, RF, optical, blue tooth, and other technologies), input/output ports, audio/video circuitry, and various other circuitry, components, and component receptacles/bays. For example, the tablet computing device 12 and the multi-attachable keyboard 14 may comprise wireless communications circuitry, such as RF circuitry, such that a user may interact with the tablet computing device 12 remotely. Moreover, the tablet computing system 10 may comprise a wireless microphone or wireless voice recognition headset to facilitate wireless user-interaction.

The multi-attachable keyboard 14 is attachable/detachable to the tablet computing device 12 in a variety of operable and storage locations, such as the storage location illustrated by FIG. 1. In each operable and storage location, the multi-attachable keyboard 14 also may be attachable/detachable in multiple orientations, which may be positionally securable or movable by a linear or rotational positioning assembly. However, the present technique provides a variety of attachment alignment structures to prevent undesirable or destructive coupling, or movement, of the tablet computing device 12 and the multi-attachable keyboard 14. In the storage attachment configuration of FIG. 1, the multi-attachable keyboard 14 may be coupled to the bottom side 26 of the tablet computing device 12 in a variety of configurations, such as keyboard-side facing inward or outward from the bottom side 26. However, in this exemplary embodiment, the tablet computing device 12 and the multi-attachable keyboard 14 comprise intercoupling structures to position and align the multi-attachable keyboard 14 such that the keyboard-side faces inward toward the bottom side 26. Accordingly, buttons and other physically movable user-interaction components of the multi-attachable keyboard 14 are protected in the stored keyboard position illustrated by FIG. 1. In operable configurations, the keyboard-side of the multi-attachable keyboard 14 is accessible during user-interaction with the display screen assembly 22 of the tablet computing device 12.

The tablet computing device 12 and the multi-attachable keyboard 14 are jointly or separately attachable to the multi-configurable docking assembly 18 at a support section 28, which is movably coupled to a base section 30. As described below, the support section 28 is movable to a variety of angles, elevations, and orientations to enhance the user's interaction with the tablet computing device 12. For example, the support section 28 is rotatable between portrait and landscape orientations and between horizontal and upright orientations. The tablet computer system 10 also comprises a screen orientation switching mechanism, which may operate automatically or manually to switch the display orientation of the display screen assembly 22 between portrait and landscape orientations. Accordingly, as discussed in further detail below, the multi-configurable docking assembly 18 may trigger a display orientation switch automatically upon moving the support section 28 between the portrait and landscape orientations, while the tablet computing device 12 is disposed in the docked configuration. This automatic switching mechanism reduces the user's tasks and ensures that text/images are always displayed in an upright/readable orientation for the user regardless of the physical orientation of the tablet computing device 12.

The tablet computing device 12 is further illustrated with reference to FIGS. 2-5. As illustrated by FIGS. 2a-2f, the tablet computing device 12 has a variety of computing components and circuitry, input/output ports, functional buttons, status indicators, security mechanisms, component attachment mechanisms, component receptacles, and expansion slots. Although specific features and components are described in detail below, the present technique may utilize any suitable technology or components.

FIG. 2a is a bottom view of the tablet computing device 12. As illustrated, the bottom side 26 has a plurality of component bays, such as bays 32, 34, and 36, which may house a battery, a hard drive, memory (e.g., RAM), or any other desired devices. The tablet computing device 12 also may have one or more device lock/release mechanisms to secure internal and external devices, such as the multi-attachable keyboard 14, a display screen cover assembly (see FIGS. 21-23), a carrying handle, a battery, removable memory, or other such components. As illustrated, the tablet computing device 12 has an internal device lock/release mechanism 38 for one or more of the components disposed within the bays 32, 34, and 36. The tablet computing device 12 also has an external device lock/release mechanism 40, which is operable to lock and release the multi-attachable keyboard 14, a protective display screen cover (see FIGS. 21-23), and other desired devices with external device mounting structures on the tablet computing device 12. Component test buttons and status indicators also may be provided to analyze one or more components, such as the components internally or externally secured to the tablet computing device 12 via the mechanisms 38 and 40. For example, the tablet computing device 12 has a component test button 42 and status buttons 44 and 46, which may be configured for analyzing the battery, the keyboard 14, or any other desired device.

As mentioned above, the computing device 12 is configured for a stand-alone or a docked configuration in a plurality of orientations, such as portrait and landscape orientations in various angles relative to a support surface. For example, the computing device 12 comprises a plurality of feet to mount the computing device 12 onto a desired surface, such as a desktop, a wall, a user's lap, or any other support surface. In this exemplary embodiment, the tablet computing device 12 comprises rubber feet 48 and 50 and adjustable feet 52 and 54, which may comprise any suitable height adjustment and locking mechanism (e.g., a flip-up mechanism with a slot-tab securement structure). For a docked configuration, the tablet computing device 12 comprises a docking connector 56 and a docking latch structure 58, which are intercoupleable with mating connector and latch structures on the multi-configurable docking assembly 18. As noted above, the tablet computing device 12 also may comprise one or more mounting alignment structures, such as docking alignment slots 60 and 62, which are intercoupleable in a single alignment orientation with mating alignment structures on the multi-configurable docking assembly 18. Similarly, alignment structures 64 and 66 may be disposed on the bottom side 26 of the tablet computing device 12 to align the keyboard 14, or other face-mountable devices, in a proper mount orientation with the tablet computing device 12. Moreover, the keyboard 14 or other face-mountable devices may be removably intercoupled with the bottom side 26 via the docking latch structure 58 or an edge-based latch mechanism.

FIG. 2b is a side view of the tablet computing device 12 illustrating such an edge based latch mechanism. As illustrated, the tablet computing device 12 has external device mount structures 68 and 70, which may comprise elongated slots having internal latch mechanisms. For example, the external device lock/release mechanism 40 may be moved to position slot-housed hook members between released and latched positions. Again, the tablet computing device 12 may have one or more attachment alignment mechanisms, such as alignment structures 72, 74, and 76, to ensure the proper attachment orientation of the external device, such as the multi-attachable keyboard 14 or a protective display cover. Accordingly, the alignment structure 72 is paired with the external device mount structure 68 and the alignment structures 74 and 76 are paired with the external device mount structure 70, such that a single mount orientation is supported. The tablet computing device 12 also may have one or more input/output ports, such as communications port 78, in an accessible position relative to the external device mount structures 68 and 70. Accordingly, an external device mounted to the tablet computing device 12 is able to communicate with the tablet computing device 12 via the communications port 78, which may comprise any suitable port. For example, the port 78 may be a serial port, a parallel port, a USB port, a wireless port, an optical port, or any other desired port. The port 78 also may comprise hot-plugging technology to facilitate attachment and detachment during operation of the tablet computing device 12.

The tablet computer system 10 also may comprise a variety of security devices, such as one or more Kensington locks, for physically securing the various components to a desired fixture. For example, each of the components illustrated by FIG. 1 may comprise a security slot, which is intercoupleable with a cable lock. Moreover, the components of the present technique may comprise multi-stage locks that provide an option to intercouple the components jointly or separately to a desired fixture using a single lock mechanism. As illustrated by FIG. 2b, the tablet computing device 12 has a lock mechanism 80, such as a Kensington lock slot. The multi-attachable keyboard 14, the digitizing pointing device 16, and the multi-configurable docking assembly 18 may have similar lock mechanisms.

As illustrated by FIG. 2c, the tablet computing device 12 also comprises a plurality of audio circuitry, such as audio ports 82, 84, and 86 and speakers 88 and 90. For example, the audio ports 82, 84, and 86 may comprise a headphone port, a cell phone port, and a microphone port, respectively. The tablet computing device 12 also may comprise a variety of video circuitry, such as a video input port, a video output port, and video processing circuitry for display on the display screen assembly 22 or an external monitor.

The tablet computing device 12 also may have one or more communications port panels, which may be exposed or concealable by a removable port panel cover. For example, as illustrated by FIG. 2d, the tablet computing device 12 has a flexible port panel door 92, which is rotatable away from the tablet computing device 12 to provide access to one or more communications ports or devices, such as serial, parallel, USB, or other ports. The flexible port panel door 92 also has a tool free latch mechanism 94, which removably couples a movable portion of the door 92 to the tablet computing device 12.

As illustrated by FIG. 2d, the tablet computing device 12 also may have a variety of edge-based component bays or receptacles, such as component receptacles 96, 98, 100, and 102. For example, the component receptacle 96 may house a PCMCIA device, such as a network card or an audio/video card. The component receptacle 98 may support a memory card, such as flash memory or other desired memory. In the illustrated embodiment, the component receptacle 100 houses a desired attachment for the digitizing pointing device 16, which is removably storable in the component receptacle 102. For example, a tether attachment may be removably disposed in the component receptacle 100.

The tablet computing device 12 also has a variety of power control and management features. As illustrated by FIG. 2d, the tablet computing device 12 may have one or more external power connectors, such as power connector 104, to support AC or DC power sources. The tablet computing device 12 also may have one or more power control buttons, such as power button 106, which may provide on/off, reset, and other power functionality. A power status and battery level indicator also may be incorporated into the tablet computing device 12. Moreover, one or more of the digitizer buttons described below may be associated with power management functions and software.

As mentioned above, a user may interact with the tablet computing device 12 without a conventional keyboard or mouse. As illustrated by FIG. 2e, the tablet computing device 12 may have a variety of control buttons, menu scroll and select mechanisms, and integral pointing devices to facilitate user interaction without an external user-interaction device. For example, as illustrated, the tablet computing device 12 comprises a jog dial 108 and functional buttons 110, 112, 114, and 116. The jog dial 108 may be used to scroll through a software menu, pages of text, or other displayed media. The functional buttons 110-116 may have default hardware or software functions, which the user may program to perform any desired hardware or software task. For example, the functional buttons 110-116 may operate as an ESC key, a TAB key, a CRL-ALT-DEL key combination, a RETURN key, a mouse key, or any standard or special key.

In this exemplary embodiment, one of the functional buttons 110-116 triggers a personal information manager, while another one of the functional buttons 110-116 triggers a quick utilities menu. The personal information manager may comprise a variety of user information and user settings, such as a personal calendar, a phone/address book, an e-mail system and log, a phone system and log, user configuration settings, a user document folder, a personal diary, and any other default or user-selected personal information. The quick utilities menu (i.e., "Q" Utilities) provides access to a variety of software and hardware settings in a quick, or short, menu-based format. Accordingly, the quick utilities menu may list hardware and software items, such as wireless functionality, video output, volume control, mute control, brightness control, contrast control, display orientation functionality (e.g., option to switch between portrait and landscape orientations), power properties, quick menu properties, properties of the tablet computing device 12, properties of the keyboard 14, properties of the digitizing pointing device 16, properties of the docking assembly 18, and a variety of functional buttons, such as PrintScreen, Alt+PrintScreen, and Clt+Alt+Del. The foregoing personal information manager and quick utilities menu also may be triggered by an icon displayed on the display screen assembly 22, by one of the digitizer buttons described below, by a button on the digitizer pointing device 16, by a button on the keyboard 14, by wireless control, by voice commands, or by any other suitable user interaction mechanism.

As illustrated by FIG. 2f, the display screen assembly 22 generally consumes the top side 24 of the tablet computing device 12. However, the tablet computing device 12 may have a variety of status indicators and user interaction devices disposed about the perimeter of the display screen assembly 22. In the illustrated embodiment, the tablet computing device 12 has status indicators 118, 120, and 122, which may comprise LED illuminable icons corresponding to the desired devices. For example, the status indicators 118, 120, and 122 may correspond to wireless activity, an AC or DC power source, a low battery level, network connectivity, a system error, processor activity, or any other desired status or activity. The illustrated embodiment also has a microphone 124 disposed in a peripheral portion of the housing 20. Moreover, as described in detail below, the tablet computing device 12 comprises a plurality of digitizer-activated buttons, such as digitizer-activated buttons 126, 128, and 130, which are activated by the digitizing pointing device 16. The foregoing digitizer-activated buttons may be associated with any desired hardware or software functions, such as a screen rotation function, a system status change function (i.e., on/off, reset, logoff, standby, etc.), a dock/undock function, a user-interaction mode (e.g., keyboard, voice recognition, digitizer write-to-text conversion, etc.), a software execution function, a hardware configuration function, or any other such functions. For example, the foregoing digitizer-activated buttons may trigger one or both of the personal information manager or the quick utilities menu described above.

FIG. 3 is a top view of the tablet computing device 12 illustrating interaction between the digitizer-activated buttons 126, 128, and 130 and the digitizing pointing device 16. As illustrated, the digitizing pointing device 16 has a tip 132 and one or more buttons, such as select button 134, to facilitate user interaction with the digitizer-activated buttons 126, 128, and 130. The operation of the digitizer-activated buttons 126, 128, and 130 and the digitizing pointing device 16 is illustrated with reference to FIGS. 4-6. FIG. 4 is an internal perspective view of the tablet computing device 12 illustrating the digitizer-activated buttons 126, 128, and 130. As illustrated, a digitizer panel 136 is disposed below, within, or integral with the display screen assembly 22.

The digitizing pointing device 16 interacts with the digitizer panel 132 throughout the dimensions of the display screen assembly 22 for coordination, selection, writing, and other user-interaction with software displayed on the display screen assembly 22. The digitizer panel 132 and the digitizing pointing device 16 may comprise any suitable digitizer technology, such as electric field, ultrasonic, radio frequency, infrared, electrostatic, electromagnetic, or any other existing or emerging technologies. The digitizer panel 132 and the digitizing pointing device 16 may operate by one-way or two-way signal transmissions, in either direction, between the digitizer panel 132 and the digitizing pointing device 16. In this exemplary embodiment, the digitizing pointing device 16 may transmit a wireless signal, which is sensed by the digitizer panel 132 to coordinate the location of the digitizing pointing device 16. The digitizing pointing device 16 also may transmit one or more secondary signals to trigger a select function or any other desired function. For example, a click of the tip 132 or the button 134 may transmit a secondary signal, which triggers a desired function.

The digitizer-activated buttons 126, 128, and 130 are provided in a peripheral region 138 of the digitizer panel 136, which has active button regions 140, 142, 144 defined for each of the buttons 126, 128, and 130, respectively. Each of these active button regions 140, 142, and 144 is associated with a desired hardware/software function, such as a default or user-defined function. The digitizer-activated buttons 126, 128, and 130 also may comprise indicators, such as LEDs 146, 148, and 150, which may be illuminated upon triggering or close proximity of the digitizing pointing device 16. For example, one of the LEDs 146-150 may light up when the tip 132 of the digitizing pointing device 16 is near a desired one of the active button regions 140-144, such that a subsequent triggering event will activate the desired button. The digitizer panel 136 and the indicators 146-150 communicate with a motherboard 152 of the tablet computing device 12 via connectors 154 and 156, respectively.

In operation, the digitizing pointing device 16 may trigger one of the digitizer-activated buttons 126, 128, and 130 by touching the top side 24 of the housing 20 above the desired active button region. Again, the indicators 146-150 may light up when the digitizing pointing device is close enough to activate the desired button. Alternatively, the desired active button region may be selected by engaging a switch mechanism in the tip 132 of the digitizing pointing device 16 (e.g., by tapping the tip 132), while the tip 132 is disposed above the desired active button region. The desired active button region also may be triggered by depressing a button, such as button 134, on the digitizing pointing device 16. The digitizing pointing device 16 also may have a separate button for each of the digitizer activated buttons 126, 128, and 130, such that the desired button may be activated remotely simply by depressing the appropriate button on the pointing device 16. Any other suitable button-triggering mechanism is also within the scope of the present technique.

As described above, the functional components of the digitizer-activated buttons 126, 128, and 130 are disposed within the housing 20, such that the triggering mechanism is entirely remote from such functional components. As such, the digitizer-activated buttons 126, 128, and 130 are relatively more durable and long lasting than conventional buttons, which require physical contact directly on the buttons. Moreover, the digitizer-activated buttons 126, 128, and 130 are not subject to accidental activation by a user, such as with conventional physical buttons or touch panel buttons.

Figure 5:
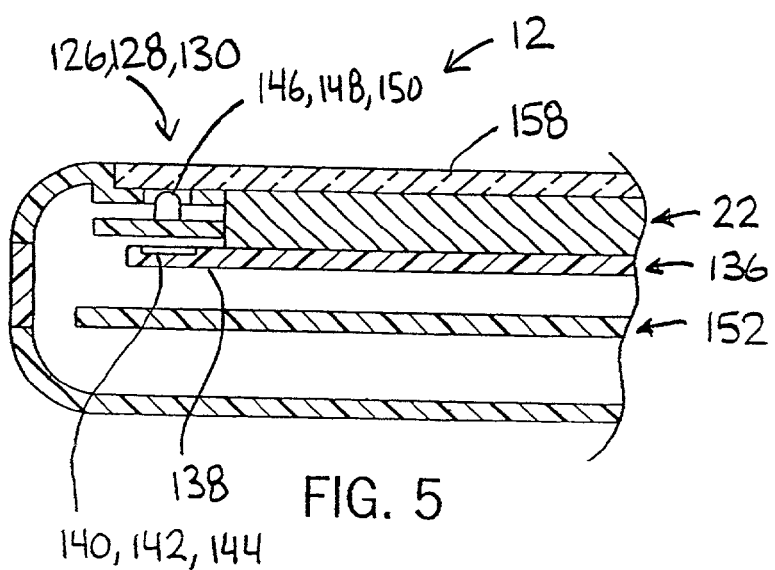
FIG. 5 is a cross-sectional side view of the digitizer assembly illustrated by FIG. 4.
Figure 6:
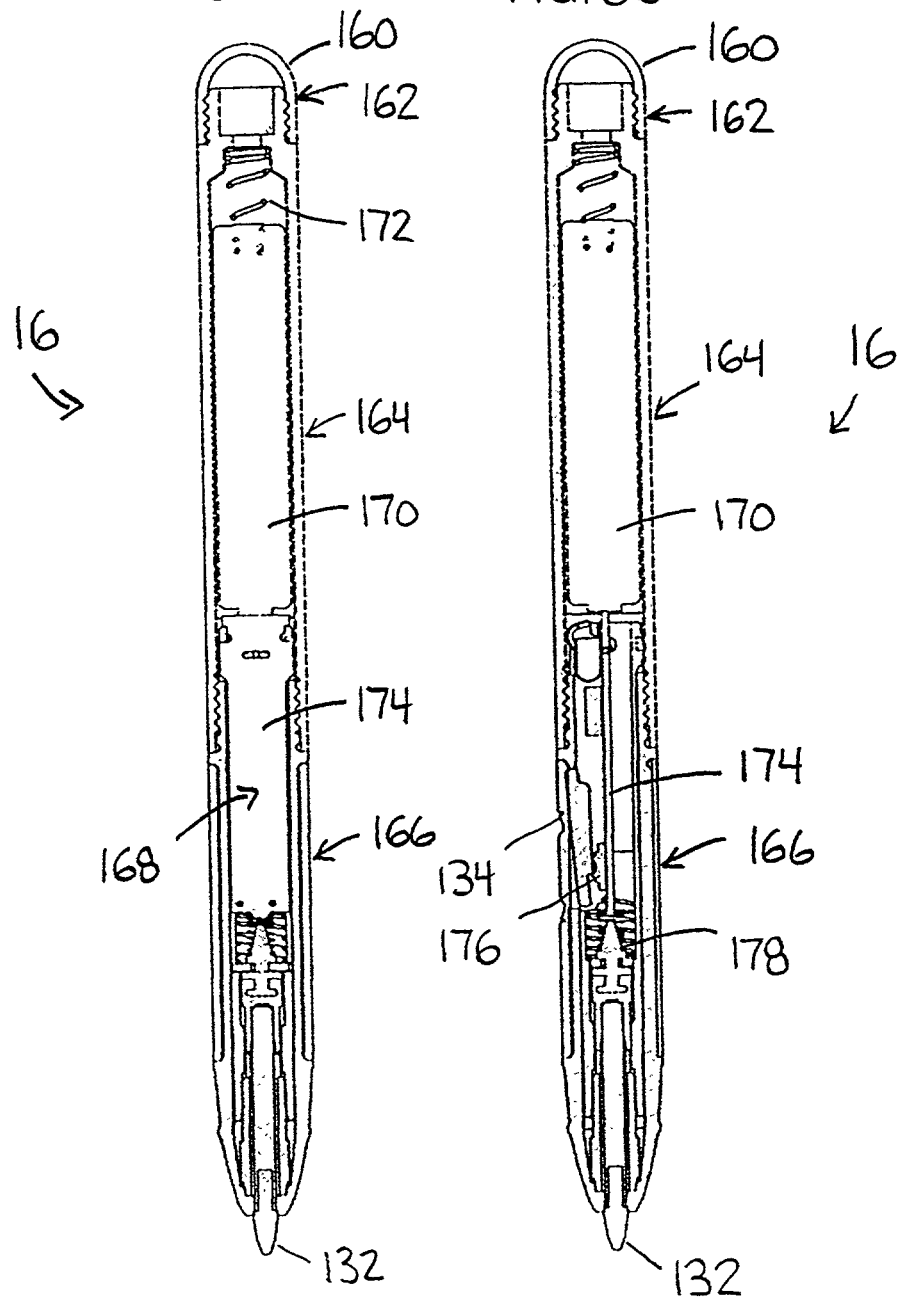
FIGS. 6a and 6b are cross-sectional side views of the digitizing pointing device illustrating internal circuitry and switch mechanisms for interaction with the digitizer assembly of FIGS. 4 and 5.

FIG. 5 is a partial cross-sectional view of the tablet computing device 12 in the housing region of the digitizer-activated buttons 126, 128, and 130. As illustrated, the display screen assembly 22 comprises a transparent cover panel 158, which extends over a bezel-structure of the housing 20 between the cover panel 158 and the active button regions 140-144 and LEDs 146-150. As mentioned above, the LEDs 146-150 illuminate button icons, or other insignia, in the transparent cover panel 158 upon triggering or active-positioning of the digitizing pointing device 16 relative to the respective active button regions 140-144. Accordingly, the transparent cover panel 158 may be back-painted with one or more materials, such as antireflective or AR coatings, while the button icons or insignia are differentiated to define the digitizer-activated buttons 126, 128, and 130.

FIGS. 6a and 6b are cross-sectional views of the digitizing pointing device 16 illustrating internal switch mechanisms for the tip 132 and the button 134. As illustrated, the digitizing pointing device 16 comprises an elongated housing 160 having a threaded end cap 162, a threaded battery section 164 coupled to the cap 162, and a threaded electronics section 164 coupled to the battery section 164. The threaded electronics section 164 comprises electronic circuitry 168, which is powered by a battery 170 that is biased against the electronic circuitry 168 by a spring 172. As illustrated, the electronic circuitry 168 comprises a printed circuit board 174 having digitizing communications circuitry, a switch 176 for the button 134, and a spring-loaded switch 178 for the tip 132.

In this exemplary embodiment, the digitizing pointing device 16 generates a signal that is received and processed by the digitizer panel 136. For example, the digitizing pointing device 16 may be a digitizer pen produced by FinePoint Innovations, Inc. of Tempe, Ariz. In operation, the signal transmitted from the digitizing pointing device 16 identifies the location of the tip 132 relative to the display screen assembly 22 (and subsurface digitizer panel 136), thereby facilitating pointer movement and drawing functions on the display screen. The digitizing pointing device 16 also may be used to select items, to interact with system software, to activate virtual buttons on the screen, to activate digitizer buttons, or to perform a variety of other functions. For example, one or more special signals may be transmitted from the digitizing pointing device 16 upon activating the switch 176 or the spring-loaded switch 178. Although the illustrated digitizing pointing device 16 is described as a signal-generating digitizer device, any suitable pen and panel digitizer system is within the scope of the present technique. For example, the signal may arise in the digitizer panel 136 rather than the digitizing pointing device 16.

Figure 7:
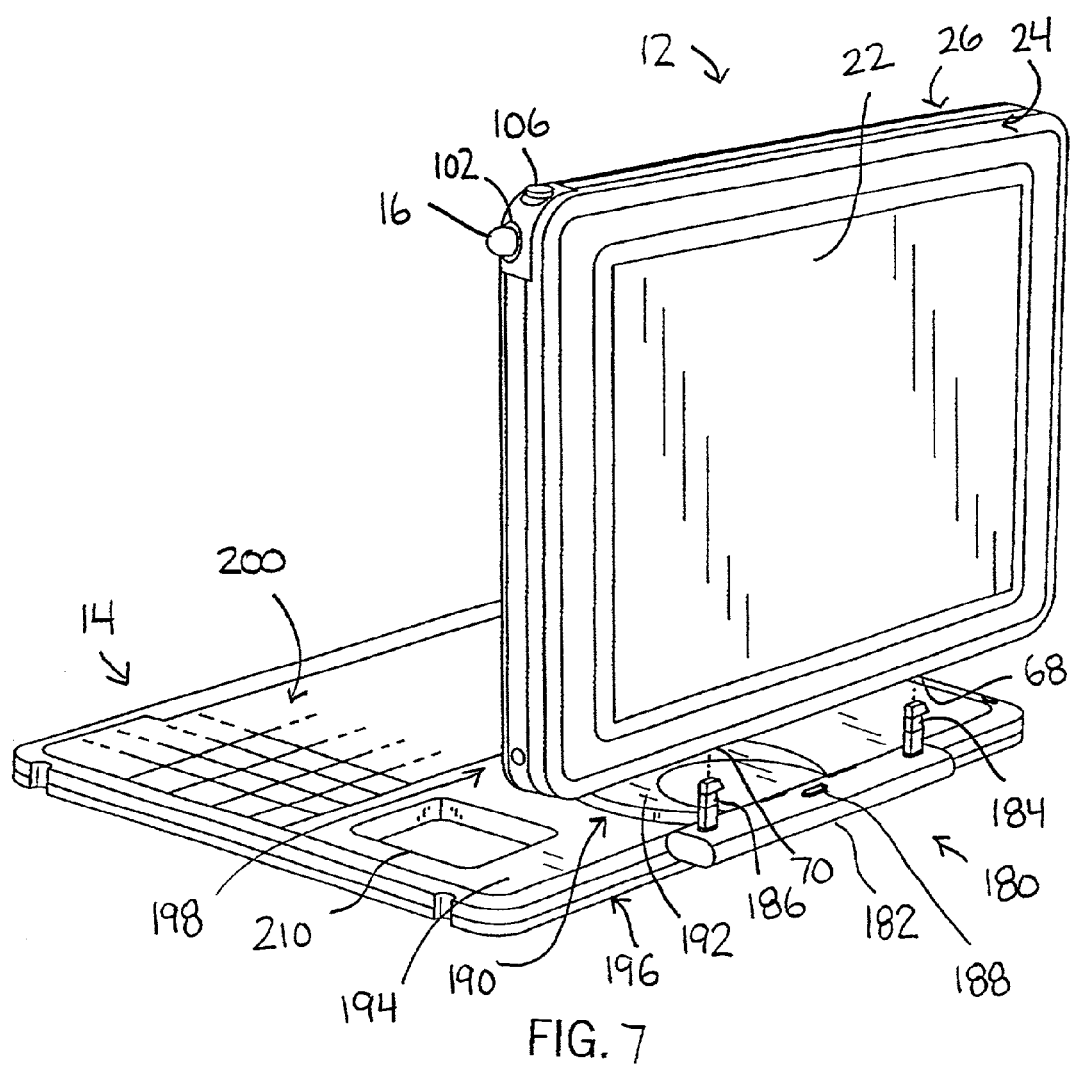
FIG. 7 is a perspective view of the tablet computing device exploded from a rotatable and pivotal mounting assembly on the multi-attachable keyboard.
Figure 8:
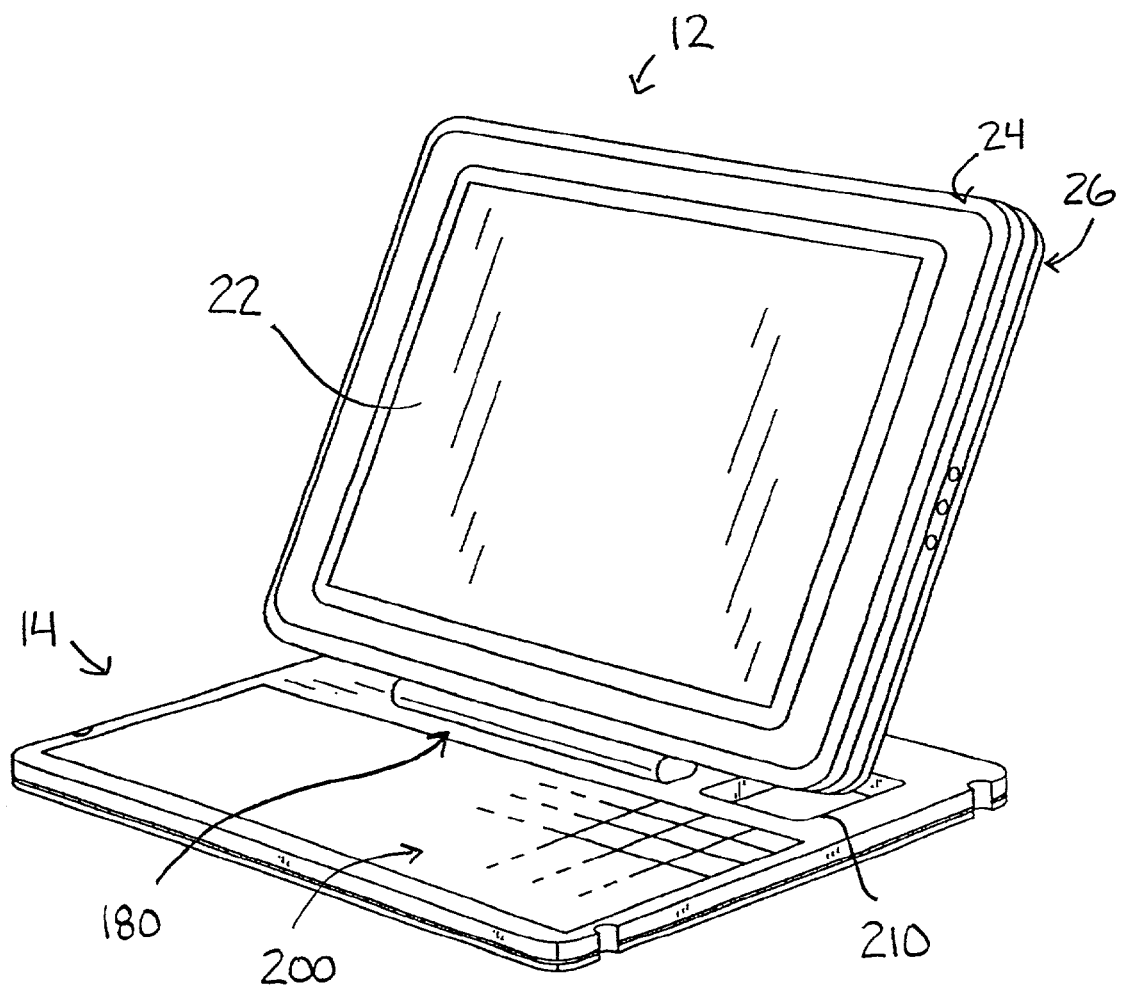
FIG. 8 is a perspective view of the tablet computing device mounted to the multi-attachable keyboard and rotated about the mounting assembly to an intermediate position adjacent a keypad.

The multi-attachable keyboard 14 is further illustrated with reference to FIGS. 7-9, which illustrate various features and mounting structures of the keyboard 14. FIG. 7 is a perspective view of the tablet computing device 12 exploded from a tablet mounting assembly 180 of the multi-attachable keyboard 14. As illustrated, the tablet mounting assembly 180 comprises a mounting bar 182 having a pair of protruding latch members 184 and 186, which are intercoupleable with the external device mount structures 68 and 70 of the tablet computing device 12. The latch members 184 and 186 and the mount structures 68 and 70 may comprise any suitable interlock and release mechanisms. However, in the illustrated embodiment, the protruding latch members 184 and 186 are oriented in a common direction, such that the latch members 184 and 186 and the mount structures 68 and 70 are intercoupleable in a single mount orientation. The mounting bar 182 also has a communications connector 188 that is connectable with the communications port 78 of the tablet computing device 12. In operation, the communications port 78 and connector 188 transmit communications between the tablet computing device 12 and the keyboard 14. However, the tablet computing device 12 and the keyboard 14 also may communicate via a wireless communications system, such as a radio frequency communications system. In either communications configuration, the foregoing unidirectional orientation of the latch members 184 and 186 ensures that the tablet computing device 12 and the multi-attachable keyboard 14 are intercoupled in the proper orientation.

The tablet mounting assembly 180 also comprises a tablet positioning assembly 190, which may have a rotatable disk structure 192 movably disposed within a top side 194 of the multi-attachable keyboard 14. As illustrated, the mounting bar 182 is coupled to an outer portion of the rotatable disk structure 192, such that the mounting bar 182 is rotatable with the rotatable disk structure 192 between a rear portion 196 and an interior portion 198 of the multi-attachable keyboard 14. The interior portion 198 is advantageously disposed adjacent a user input section 200 of the keyboard 14. The user input section 200 may comprise keyboard buttons, a pointing device, and a variety of other user-interactive features. Accordingly, the tablet computing device 12 is rotatable to the interior portion 198, such that the display screen assembly 22 faces the user input section 200 for simultaneous use of both the tablet computing device 12 and the keyboard 14, as illustrated by FIG. 8.

The mounting bar 182 is also hingedly coupled to the rotatable disk structure 192, such that the tablet computing device 12 is pivotal between an upright orientation and a parallel orientation relative to the keyboard 14. In the parallel orientation, as illustrated by FIG. 1, the user input section 200 is disposed between the keyboard 14 and the bottom side 26 of the tablet computing device 12. However, the present technique also may provide a reverse attachment mechanism, which positions the display screen assembly 22 toward the user input section 201 in one or both of the upright and parallel orientations. In the upright orientation, the tablet computing device 12 is pivotal to the desired viewing orientation, as illustrated by FIG. 8.

The multi-attachable keyboard 14 is further illustrated with reference to FIGS. 9a-9e, which are top and side views of the keyboard 14. As illustrated by the bottom view of FIG. 9a, the keyboard 14 has a plurality of support members, such as rubber feet 202, 204, 206, and 208. The keyboard 14 also has a plurality of dock mount structures to facilitate mounting of the keyboard 14 with the multi-configurable docking assembly 18. The following dock mount structures may comprise any suitable male/female guide mechanism, latch mechanism, color coding, labeling, or other features to ensure that the user assembles components of the tablet computer system 10 properly.

In this exemplary embodiment, the keyboard 14 has a dock mount orientation slot 210 and pass through slots 212, 214, 216, and 218, which allow the keyboard 14 to rest deeper within the support section 28 than the tablet computing device 12. In a docked configuration, the dock mount orientation slot 210 is positioned about a dock mount orientation structure 220, which protrudes from the support section 28 illustrated by FIG. 1. The dock mount orientation structure 220 also has a docking connector 222, which is communicatively coupleable with the docking connector 56 of the tablet computing device 12 in the docked configuration. Accordingly, the dock mount orientation features 210 and 220 ensure that the keyboard 14, or an attached assembly of the keyboard 14 and the tablet computing device 12, docks with the multi-configurable docking assembly in the proper orientation. The dock mount orientation slot 210 also allows the docking connectors 56 and 222 to pass through the keyboard 14 and connect.

In the docked configuration, the pass through slots 212, 214, 216, and 218 of the keyboard 14 are positioned about docking guide tabs 224, 226, 228, and 230 (e.g., rubber tabs), respectively. The present technique provides additional guides for the tablet computing device 12, which has the docking alignment slots 60 and 62 illustrated by FIGS. 2a-2e. The tablet computing device 12 does not have pass through slots for the docking guide tabs 224-230. Accordingly, the docking guide tabs 224-230 operate as positional offsets for the tablet computing device 12. In the docked configuration, the docking alignment slots 60 and 62 of the tablet computing device 12 pass through docking guide tabs 232 and 234 of the support section 28, as illustrated by FIG. 1. The asymmetrical positioning of the docking alignment slots 60 and 62 and the docking guide tabs 232 and 234 ensures a proper docking orientation of the tablet computing device 12.

Returning now to FIG. 9a, the multi-attachable keyboard 14 also may have one or more lock/release mechanisms, such as those described with reference to the tablet computing device 12 of FIGS. 2a-2e. For example, the keyboard 14 may have an external device lock/release mechanism 236, which may be moved to either engage or disengage one or more device interlock structures. As illustrated by FIG. 9b, interlock structures 238 and 240 may be disposed along an edge of the keyboard 14 for releasable attachment with an external device, such as a protective display screen cover (see FIGS. 24-26). The keyboard 14 also may have attachment orientation guides, such as guides 242, 244, and 246, to facilitate a proper attachment orientation of the external device to the keyboard 14. For example, as described above with reference to FIG. 2b, the foregoing guides 242, 244, and 246 may be disposed asymmetrically relative to the interlock structures 238 and 240 to limit attachment to a single orientation. Accordingly, the guides 242-246 prevent undesirable or destructive attachment orientations.

FIGS. 9c-9e are top and side views of the keyboard 14 further illustrating features of the keyboard 14 and functionality of the tablet mounting assembly 180. As illustrated by FIG. 9c, the mounting bar 182 is pivotally coupled to the keyboard 14 via a hinge assembly 248, which may comprise any suitable pivotal or rotatable mechanism. Wiring for the communications connector 188 extends through the hinge assembly 248, such that the wiring twists about an axis of the hinge assembly 248 rather than actively bending. Referring to FIG. 9d, the wiring then enters an inner receptacle of the rotatable disk structure 192, which is limited to a desired range of angular rotation (e.g., 180 degrees between the rear portion 196 and the interior portion 198 of the keyboard 14). Accordingly, the present technique prolongs the life of the wiring by minimizing bending of the wiring in the hinge assembly 248 and the rotatable disk structure 192.

As illustrated by FIG. 9d, the user input section 200 of the keyboard 14 comprises an array of keyboard buttons 250, a pointing device 252, select buttons 254 and 256 for the pointing device 252, and a plurality of status indicators, such as a caps lock LED 258 and a number lock LED 260. The keyboard 14 also may have one or more keyboard lock/release mechanisms, such as lock/release mechanism 262. The lock/release mechanism 262 is disposed on a front edge 264 of the keyboard 14, as illustrated by FIGS. 9d and 9e. The lock/release mechanism 262 is operable to engage or disengage latches 266 and 268 with mating latch mechanisms on an external device, such as the tablet computing device 12. For example, the latches 266 and 268 are intercoupleable with mating latch structures 270 and 272 on the bottom side 26 of the tablet computing device 12, as illustrated by FIG. 2a. Accordingly, the latch members 266-272 secure the keyboard 14 to the tablet computing device 12 in the closed storage configuration illustrated by FIG. 1. The edge-mounting of the lock/release mechanism 262 facilitates disengagement of the foregoing latch members 266-272 from the closed storage configuration of FIG. 1. Any suitable latch and release mechanism is within the scope of the present technique.

Figure 10C:
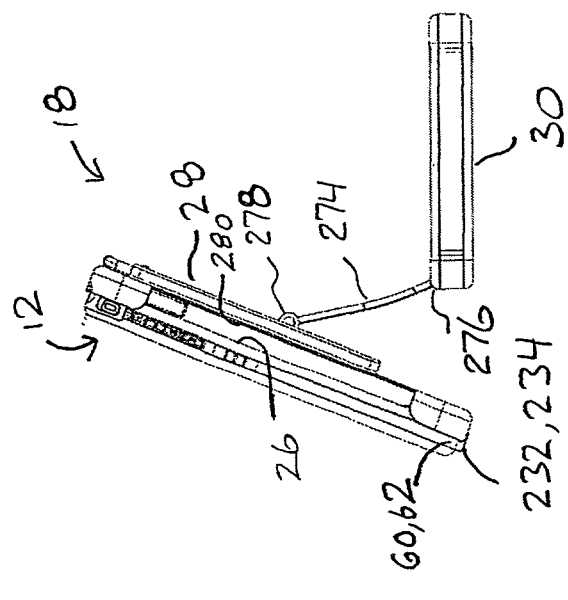
FIGS. 10a-10c are side views illustrating an exemplary tablet docking process for docking the tablet computing device with the multi-configurable docking assembly.
Figure 10B:
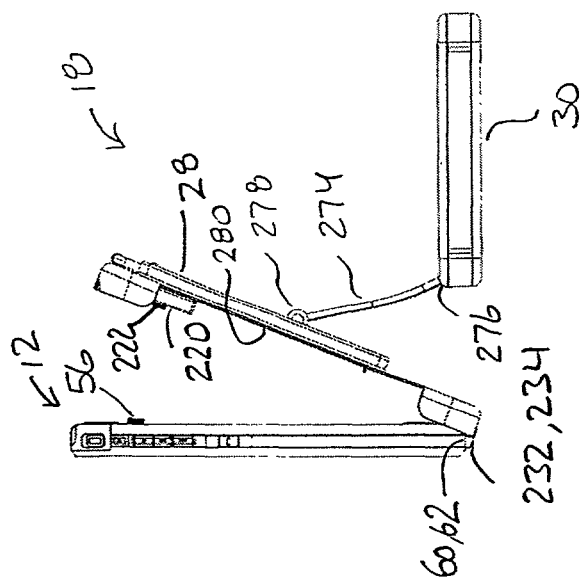
Figure 10A:
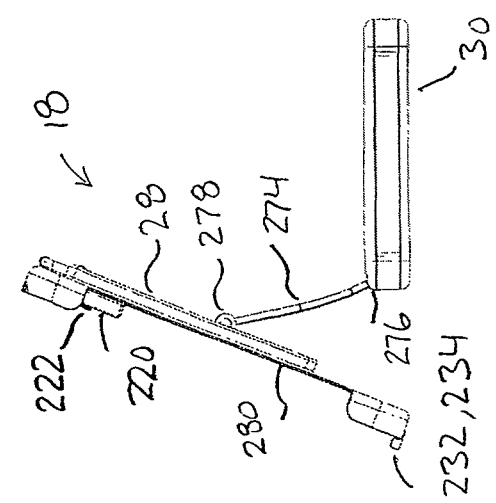

As discussed above, the multi-attachable keyboard 14 and the tablet computing device 12 are dockable jointly or independently with the multi-configurable docking assembly 18, which is further illustrated with reference to FIGS. 10-20. FIGS. 10a-10c are side views illustrating an exemplary process of docking the tablet computing device 12 to the multi-configurable docking assembly 18 without the multi-attachable keyboard 14. As illustrated by FIG. 10a, the multi-configurable docking assembly 18 comprises an orientation adjustment arm 274 for the support section 28. The orientation adjustment arm 274 is rotatably coupled to the base section 30 via a hinge assembly 276, which may comprise any suitable clutch or positional securement assembly for holding the orientation adjustment arm 274 in the desired angular orientation. Similarly, the orientation adjustment arm 274 is rotatably coupled to the support section 28 via a hinge assembly 278, which may comprise any suitable clutch or positional securement assembly for holding the support section 28 in the desired angular orientation. The hinge assemblies 276 and 278 also may comprise any suitable electrical conductor routing structure that prevents undesirable bending and fatigue of the electrical wiring extending between the base section 30 and the docking connector 222 for the tablet computing device 12. For example, as described above with reference to the hinge assembly 248 of the keyboard 14, the hinge assemblies 276 and 278 may route the electrical wiring along the hinge axis, such that the electrical wiring twists over an axial distance rather than actively bending at a point. This distributed twisting mechanism substantially reduces the wear and fatigue of the wiring.

FIG. 10b is a side view illustrating the tablet computing device 12 in the process of docking with the support section 28 of the multi-configurable docking assembly 18. As illustrated, the present technique ensures the proper docking orientation by guiding the user to align the docking alignment slots 60 and 62 of the tablet computing device 12 with the docking guide tabs 232 and 234 of the support section 28, respectively. After aligning the docking alignment slots 60 and 62 with the docking guide tabs 232 and 234, the tablet computing device 12 may be lowered onto the support section 28 into a docked configuration, as illustrated by FIG. 10c. Although FIG. 10b illustrates a pivotal docking motion about the docking guide tabs 232 and 234, the tablet computing device 12 may be lowered vertically straight onto the support section 28. As the tablet computing device 12 approaches the dock mount orientation structure 220, the docking connectors 56 and 222 engage and provide a communications connection between the tablet computing device 12 and the multi-configurable docking assembly 18. As mentioned above, the dock mount orientation structure 220 and the docking guide tabs 224-230 also operate to offset the bottom side 26 of the tablet computing device 12 from an interior bottom side 280 of the support section 28. The foregoing offset between the bottom side 26 and the interior bottom side 280 accommodates the multi-attachable keyboard 14, as discussed below.

The tablet computing device 12 is securable and releasable from the support section 28 by any suitable lock/release assembly, which may have a release switch disposed on either one or both of the tablet computing device 12 and the multi-configurable docking assembly 18. Moreover, the foregoing lock/release assembly may comprise an electrical/mechanical latch mechanism, which may be controlled via an automatic or user-interactive hardware and software control system.

FIGS. 11a-11c are side views illustrating an exemplary process of docking a tablet-keyboard assembly 282 of the tablet computing device 12 and the keyboard 14 to the multi-configurable docking assembly 18. As discussed above, the support section 28 has the docking guide tabs 232 and 234 to facilitate proper docking orientation of the tablet computing device 12. The support section also has the dock mount orientation structure 220 and the docking guide tabs 224-230 to facilitate proper docking orientation of the keyboard 14. The tablet-keyboard assembly 280 is jointly dockable with the support section 28 by aligning the dock mount orientation structure 220 with the dock mount orientation slot 210 of the keyboard 14. The docking guide tabs 224-230 also facilitate proper docking alignment by guiding the user to position the pass through slots 212-218 of the keyboard 14 over the docking guide tabs 224-230.

As illustrated by FIG. 11b, the tablet-keyboard assembly 282 may be docked with the support section 28 by engaging the docking alignment slots 60 and 62 with the docking guide tabs 232 and 234 and by engaging the pass through slots 212 and 216 with the docking guide tabs 224 and 228. After aligning the foregoing slots and tabs, the tablet-keyboard assembly 282 may be lowered onto the support section 28 into a docked configuration, as illustrated by FIG. 11c. Although FIG. 11b illustrates a pivotal docking motion about the docking guide tabs, the tablet-keyboard assembly 282 may be lowered vertically straight onto the support section 28. As the tablet-keyboard assembly 282 approaches the dock mount orientation structure 220, the dock mount orientation slot 210 of the keyboard 14 passes around the dock mount orientation structure 220. The docking connectors 56 and 222 then engage to provide a communications connection between the tablet-keyboard assembly 282 and the multi-configurable docking assembly 18. In the joint tablet-keyboard docked configuration of FIG. 11c, the keyboard 14 rests on the interior bottom side 280 of the support section 28, while the bottom side 26 of the tablet computing device 12 rests on the keyboard 14, the dock mount orientation structure 220, and the docking guide tabs 224-230.

Similar to the docking configuration illustrated by FIGS. 10a-10c, the joint tablet-keyboard docked configuration of FIG. 11c may utilize any suitable lock/release assembly. For example, the lock/release assembly may comprise a hook and latch assembly, a friction-based securement assembly, a spring-based system, a compressive fit between the tablet-keyboard assembly 282 and the support section 28, or any other suitable electrical or mechanical securement mechanism. Moreover, the lock/release assembly may have a release switch disposed on either one or both of the tablet-keyboard assembly 282 and the multi-configurable docking assembly 18. The foregoing lock/release assembly also may comprise an automatic or user-interactive hardware/software control system. Accordingly, the user may initiate a docking or undocking sequence by pressing a key, by dictating a voice command, by touching the digitizing pointing device 16 on a digitizer button or screen icon, by moving a mechanical switch, or by any other suitable activation mechanism.

Figure 12:
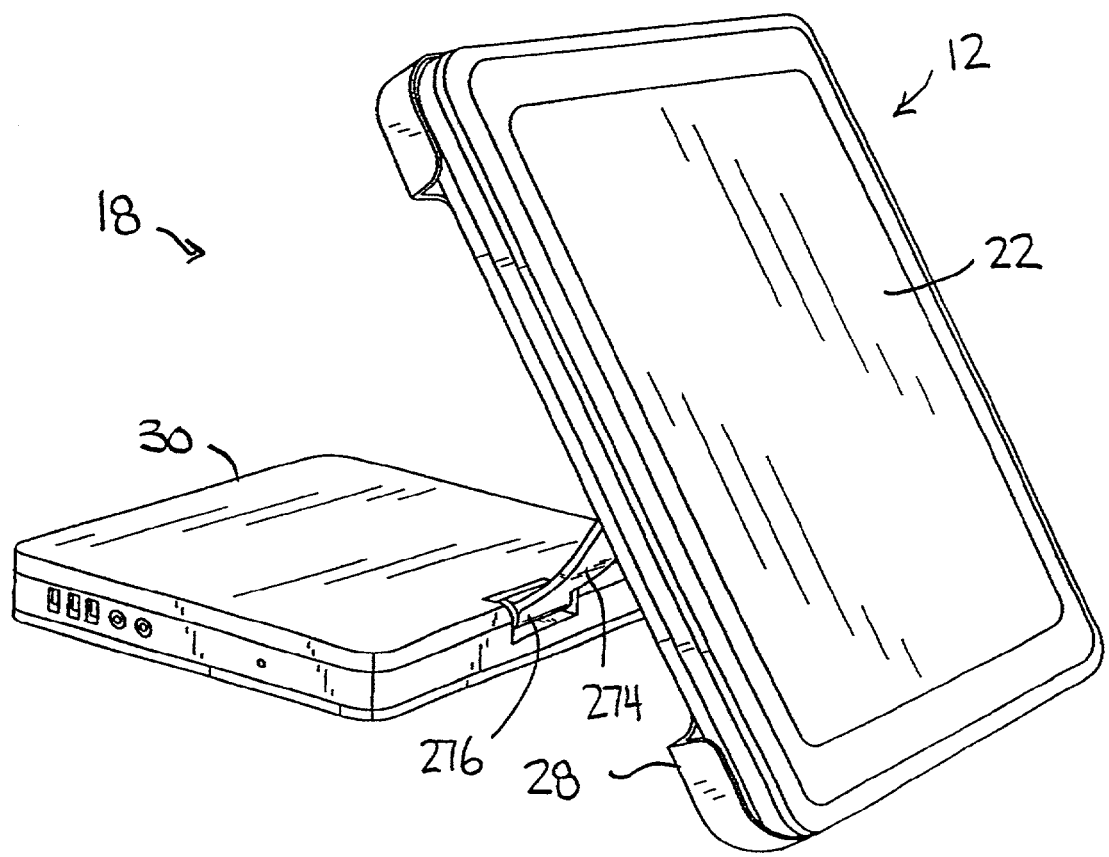
FIG. 12 is a front perspective view of the tablet computing device docked with the multi-configurable docking assembly in a substantially upright portrait orientation.

FIG. 12 is a front perspective view of the tablet computing device 12 docked to the multi-configurable docking assembly 18 in a portrait orientation. As discussed in further detail below, the multi-configurable docking assembly 18 may be manipulated to change the orientation of the docked tablet computing device 12 between portrait and landscape orientations, between horizontal and upright orientations, and between a variety of other storage and user-interactive positions. For example, the orientation adjustment arm 274 and the support section 28 may be rotated about hinge assemblies 276 and 278 to position the support section 28 in a substantially horizontal orientation, which may be particularly advantageous for user-interaction with the display screen assembly 22 using the digitizing pointing device 22.

Figure 13:
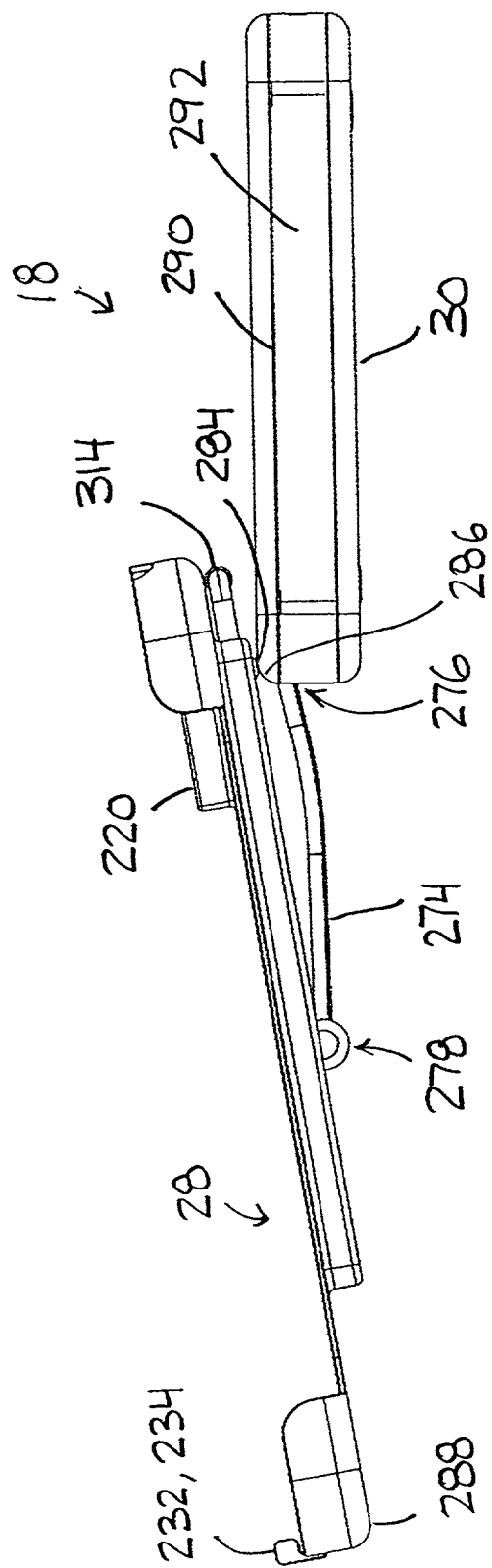
FIG. 13 is a side view of the multi-configurable docking assembly configured in a generally horizontal portrait orientation.

FIG. 13 illustrates a side view of the multi-configurable docking assembly 18 in a horizontal configuration having the support section 28 disposed in a portrait orientation. As illustrated, an upper rear portion 284 of the support section 28 rests on a top portion 286 of the base section 30 in this horizontal-portrait configuration. A lower rear portion 288 of the support section 28 rests on the mounting surface for the multi-configurable docking assembly 18. The multi-configurable docking assembly 18 also may provide one or more flexible support members (e.g., rubber pads) at the lower rear portion 288 and at the support interface between the upper rear portion 284 and the top portion 286. Accordingly, these flexible support members soften the mounting interface and provide a frictional holding force to secure the multi-configurable docking assembly 18 in the desired position.

Figure 14:
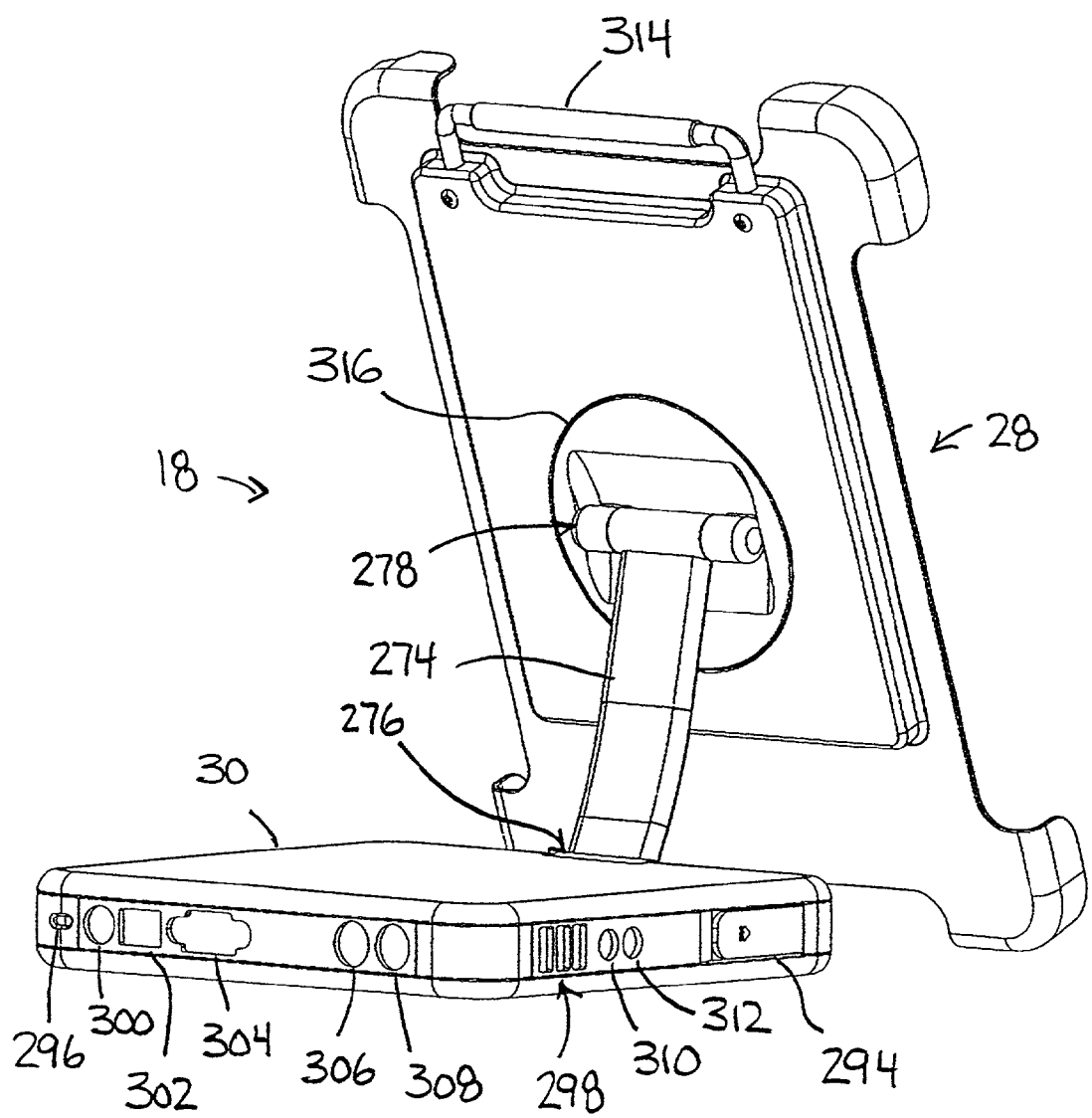
FIG. 14 is a rear perspective view of the multi-configurable docking assembly illustrating exemplary communications ports, a handle/docking release assembly, and a rotational adjustment assembly.

As illustrated by FIGS. 13 and 14, the base section 30 of the multi-configurable docking assembly 18 has a plurality of expansion ports, bays, and components for the tablet computing device 12. As illustrated by FIG. 13, the base section 30 has a modular bay 290 for a modular computing component 292, which may comprise a floppy disk drive, a CD/DVD drive, a hard drive, a battery, a processor, a communications module, or any other desired circuitry or device. In this exemplary embodiment, the modular bay 290 is configured to allow swapping of modular components, such that the user may select the desired component for a particular application. The modular computing component 292 is removable and swappable with another component by engaging a component eject latch 294, as illustrated by FIG. 14.

FIG. 14 is a rear perspective view of the multi-configurable docking assembly 18 illustrating a plurality of communications ports and other device slots, such as PCMCIA slots. For example, the base section 30 has a security slot 296 (e.g., a Kensington lock slot), ventilation openings 298, and communication ports 300-312. The communication ports 300-312 may comprise any desired input/output data ports, such as a monitor port, a PS/2 port, a USB port, a serial port, a parallel port, a wireless communications port, a game port, a network/ Ethernet port, a modem port, an audio port, or any other desired port. The base section 30 also may comprise a variety of internal circuitry and computing components, such as a processor and memory. In the support section 28, the multi-configurable docking assembly 18 also has a handle 314 and a rotational adjustment assembly 316, which is pivotally coupled to the orientation adjustment arm 274 via the hinge assembly 278.

The handle 314 may be used to carry the multi-configurable docking assembly 18 with or without the tablet computing device 12 and/or keyboard 14 in a docked configuration. The handle 314 also may be coupled to an internal latch/release mechanism, which allows docking and release of the tablet computing device 12 and the keyboard 14. For example, inward movement of the handle 314 may trigger a release of the tablet computing device 12, while an outward movement of the handle 314 may lock the latch/release mechanism to secure the tablet computing device 12 in the docked configuration.

The rotational adjustment assembly 316 is provided to facilitate rotational adjustment of the support section 28 and the docked tablet computing device 12. For example, the user may rotate the support section 28 between the illustrated portrait orientation and a landscape orientation, as discussed below with reference to FIG. 17. FIG. 15 is a partial cross-sectional side view of the multi-configurable docking assembly 18 illustrating the hinge assemblies 276 and 278 and the rotational adjustment assembly 316. As illustrated, a communications conductor bundle 318 extends between the support and base sections 28 and 30 through the hinge assembly 276, through the orientation adjustment arm 274, through the hinge assembly 278, and through the rotational adjustment assembly 316 to the docking connector 222. In each of the hinge assemblies 276 and 278, the communications conductor bundle 318 extends along the rotational axis of the hinge assemblies to distribute motion of the bundle 318 along the axis and prolong the life of the bundle 318. The rotational adjustment assembly 316 also minimizes motion of the bundle 318 by providing a wiring slot 320, which extends through the rotational adjustment assembly 316 over a desired rotational range, such as 90 or 180 degrees. For example, the wiring slot 320 illustrated by FIG. 16 extends over a 180 degree rotational range. Accordingly, the rotational adjustment assembly 316 does not subject the communications conductor bundle 318 to undesirable bending or twisting.

As illustrated by FIG. 15, the rotational adjustment assembly 316 is disposed in a rear housing 322 of the support section 28, such that the communications conductor bundle 318 can be routed to the docking connector 222. In the illustrated embodiment, the rotational adjustment assembly 316 comprises a disk-shaped structure 324, which is rotatably disposed in circular openings 326 and 328 in front and rear sides 330 and 332 of the rear housing 322, respectively. The disk-shaped structure 324 is aligned and secured within the openings 326 and 328 by ring-shaped lips 334 and 336, which extend around the disk-shaped structure 324 at opposite sides for a recessed and movable fit within the circular openings 326 and 328, respectively.

FIG. 16 is a cross-sectional face view of the disk-shaped structure 324 illustrating routing of the communications conductor bundle 318, a rotational catch mechanism, and a display orientation switching/sensing mechanism. As discussed above, the communications conductor bundle 318 extends axially along the hinge assembly 278 to an end opening 352, which routes the bundle 318 into an interior portion 354 of the disk-shaped structure 324. The bundle 318 then passes through the wiring slot 320, which extends around an angular portion of the disk-shaped structure 324 such that the bundle 318 does not bend during angular movement of the support section 28.

The rotational catch mechanism illustrated by FIG. 16 comprises a spring clip snap 338, which is springably securable in one of a plurality of angular orientation recesses within the disk-shaped structure 324. For example, the illustrated disk-shaped structure 324 has angular orientation recess 340 and 342, which correspond to landscape and portrait viewing orientations (e.g., horizontal and upright orientations). Any other suitable angular securement mechanism is also within the scope of the present technique.

As illustrated in FIG. 16, the display orientation switching/sensing mechanism comprises a switch engagement tab 344 on the disk-shaped structure 324 and a switch assembly 346 secured within the rear housing 322, as illustrated by FIG. 15. For example, the switch assembly 346 may include a rotational stop member 348 and an electrical switch 350, which may be switched during contact with the switch engagement tab 344. Upon removal of the switch engagement tab 344, the electrical switch 350 returns to its default state. However, any suitable switching or angular sensing mechanism is within the scope of the present technique. In operation, the switch engagement tab 344 rotates with the disk-shaped structure 324 as the user rotates the support section 28 between landscape and portrait orientations. For example, the switch engagement tab 344 and the switch assembly 346 may be oriented such that the switch assembly 346 is activated at the landscape orientation, while it is deactivated as the support section 28 is moved back to the portrait orientation.

The display orientation switch mechanism also may comprise a variety of software and hardware circuitry to change the displayed viewing orientation on the display screen assembly 22 in response to a physical change in the angular orientation of the support section 28 and docked tablet computing device 12. For example, if the state of the electronics switch 350 is changed in response to a physical rotation of the support section 28 and tablet computing device 12, then software and/or hardware may automatically execute a display orientation change between landscape and portrait modes of the display screen assembly 22. In the illustrated embodiment, the orientation change sensed by the switch assembly 346 is communicated to the tablet computing device 12, which then initiates an automatic display orientation change to accommodate the physical orientation change without user intervention. Although not illustrated, the present technique may use any suitable angular sensing or switching mechanism to trigger the foregoing change in the display orientation on the tablet computing device 12. For example, one or more angular position switches or sensors may be disposed on one or both of the tablet computing device 12 and the multi-configurable docking assembly 18. For example, the present technique may use optical technology, wireless technology, and/or electrical/mechanical technology to sense a critical angular position, which triggers one or more display mode changes or operational mode changes of the tablet computing device 12. Moreover, the tablet computing device 12 may have an override mechanism or a configuration mechanism for the foregoing mode switching, sensing, and altering mechanisms. For example, a user interface may be provided for adjusting the display properties associated with the foregoing display orientation change.

One or both of the hinge assemblies 276 and 278 of the docking assembly 18 may have angular sensing or switch assemblies, such as that described above with reference to the rotational adjustment assembly 316. For example, as illustrated in FIG. 15, an electronic switch 356 may be disposed adjacent the hinge assembly 276 to sense an orientation change between upright and horizontal configurations of the orientation adjustment arm 274 and the attached support section 28. Again, the orientation change sensed by the switch assembly 356 is communicated to the tablet computing device 12, which then initiates a desired function associated with the physical orientation change. For example, engagement of the switch assembly 356 may trigger a change in operating system modes for the tablet computing device 12. In a horizontal configuration, the operating mode may correspond to a user-interactive handwriting mode using the digitizing pointing device 16. The switch assembly 356 also may start a desired program, such as a personal diary or a writing-to-text conversion program. Although not illustrated, the tablet computer system 10 also may have a variety of other switch mechanisms that trigger desired software or hardware features in response to physical transformations of the system 10. For example, the rotatable disk structure 192 of the keyboard 14 may have an automatic viewing orientation switching mechanism, which changes the display orientation to landscape upon interconnection or rotation between the tablet computing device 12 and the keyboard 14. Again, as described above, the present technique may use optical technology, wireless technology, and/or electrical/mechanical technology to sense a critical position, which triggers one or more operational mode changes or functions of the tablet computing device 12.

Figure 17:
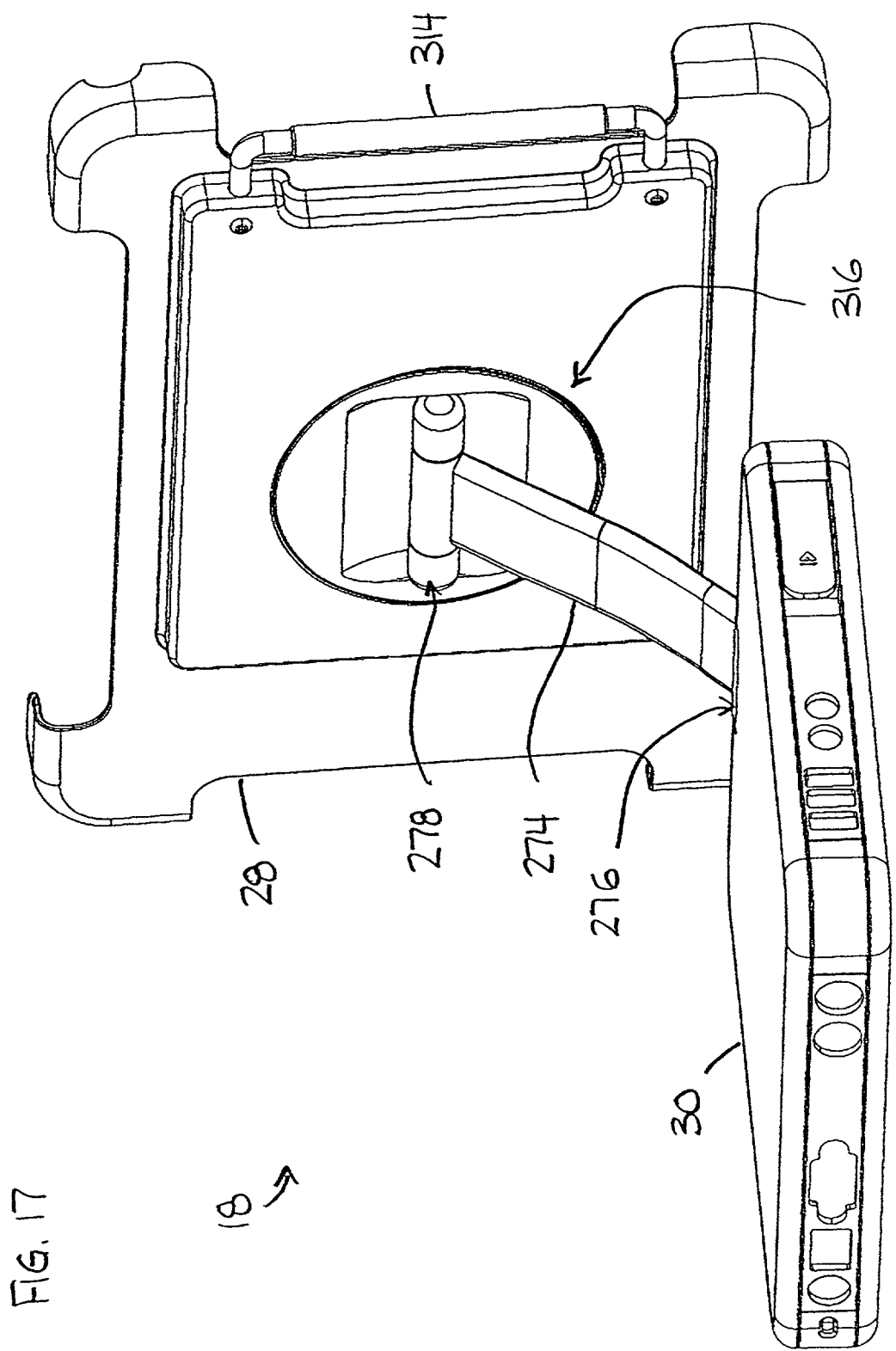
FIG. 17 is a rear perspective view of the multi-configurable docking assembly configured in a generally upright landscape orientation.
Figure 18:
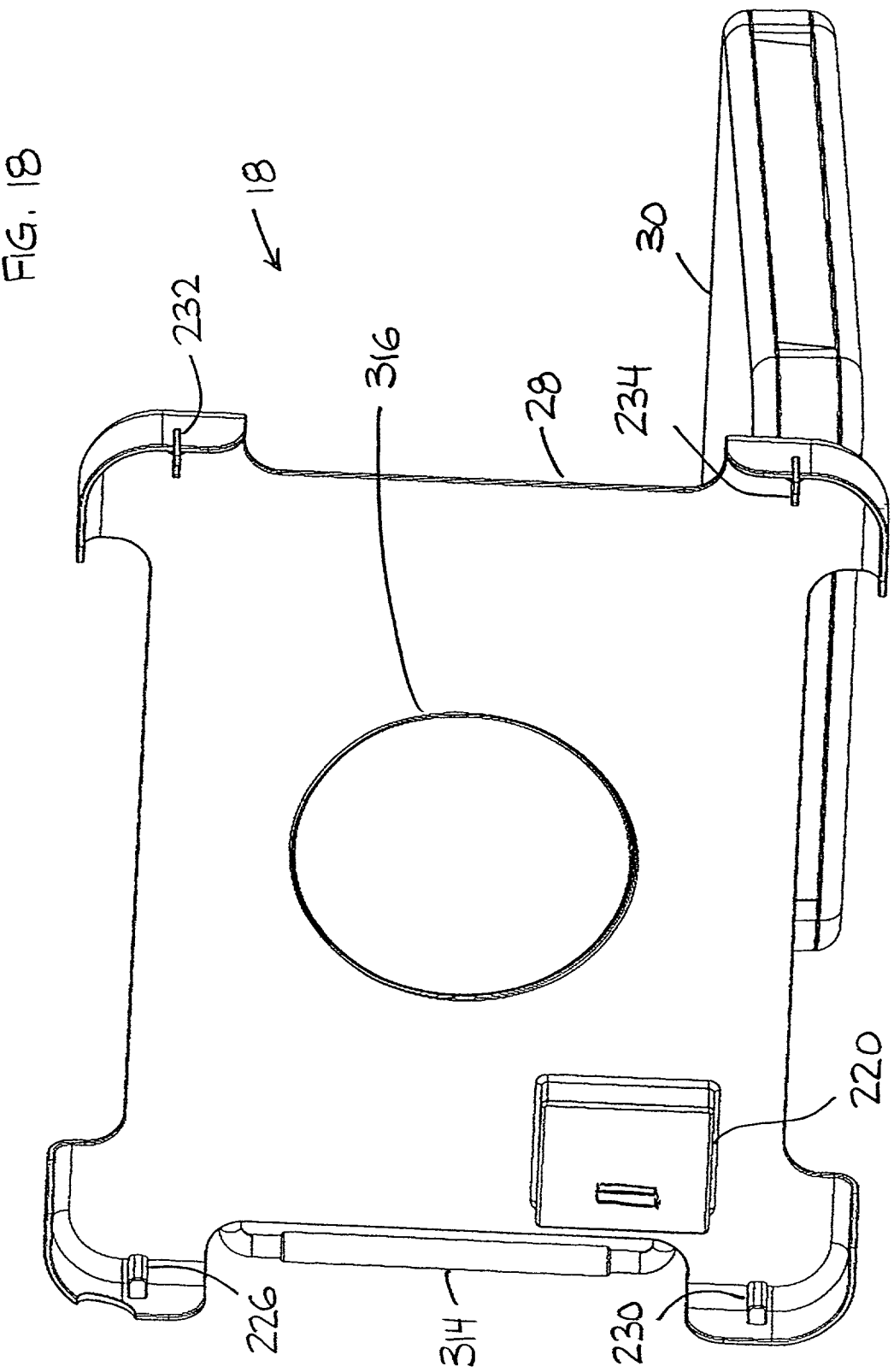
FIG. 18 is a front perspective view of the multi-configurable docking assembly configured in the generally upright landscape orientation illustrated by FIG. 17.
Figure 19:
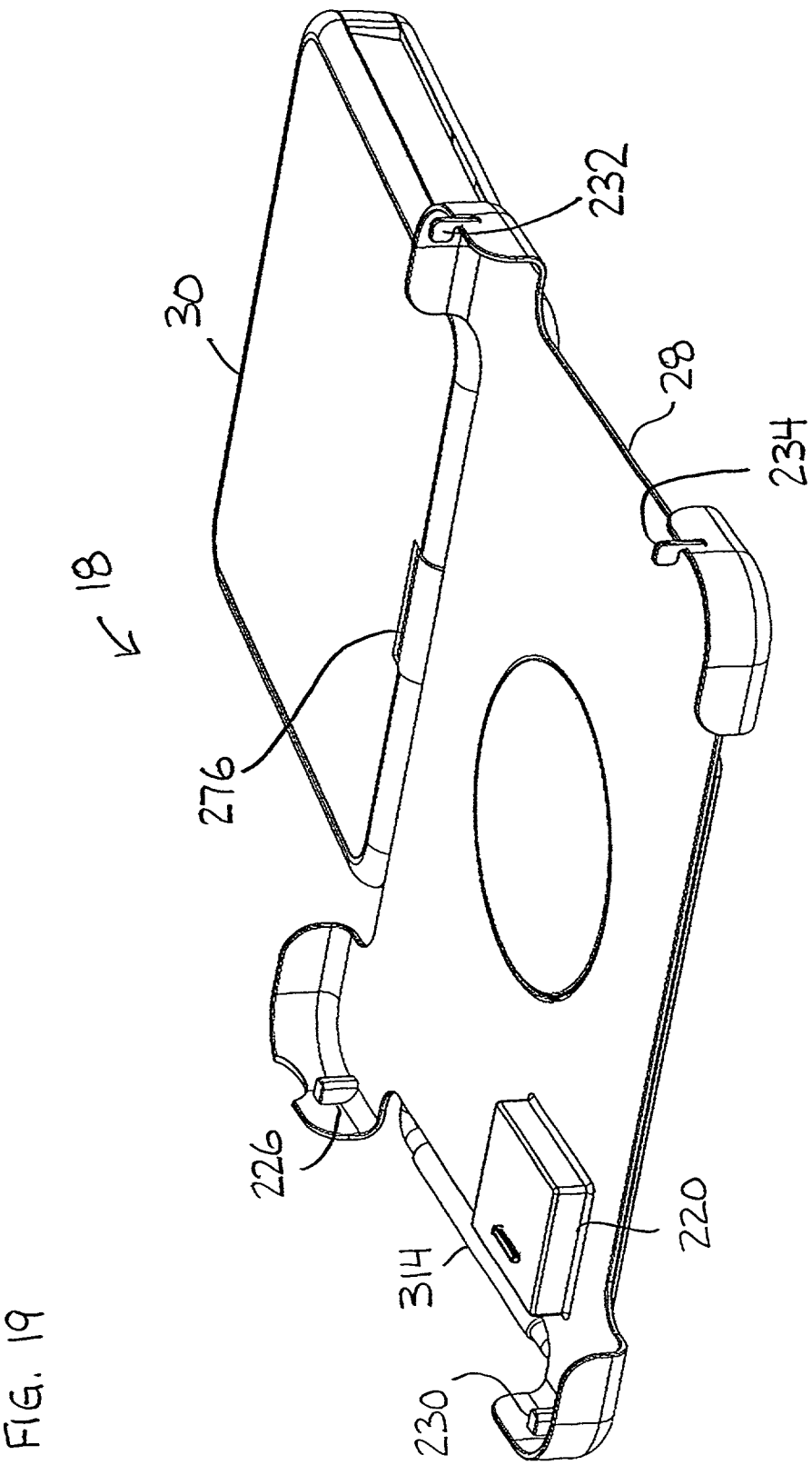
FIG. 19 is a front perspective view of the multi-configurable docking assembly configured in a generally horizontal landscape orientation.
Figure 20:
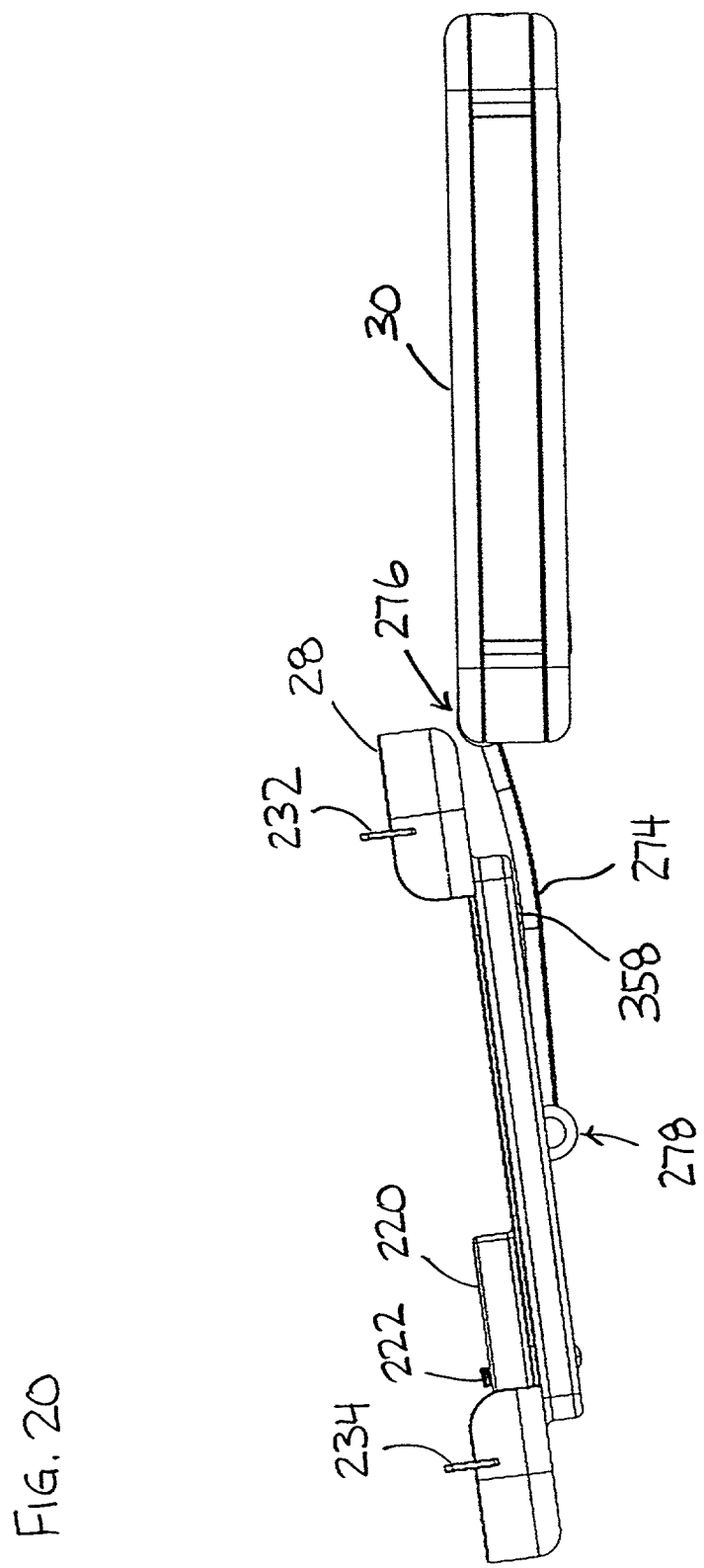
FIG. 20 is a side view of the multi-configurable docking assembly configured in the generally horizontal landscape orientation illustrated by FIG. 19.

Various configurations of the multi-configurable docking assembly 18 are illustrated with reference to FIGS. 17-20. In each of these configurations, the tablet computing device 12 and the keyboard 14 may be separately or jointly docked with the multi-configurable docking assembly 18. Moreover, the various orientations may be switched manually or automatically via suitable switching/sensing mechanisms, which ensure that the text/images are readable in the present physical orientation of the tablet computing device 12. FIGS. 17 and 18 are rear and front perspective views of the multi-configurable docking assembly 18 illustrating an upright landscape configuration of the support section 28. Again, the switching assembly 346 triggers an automatic change in the display orientation to a landscape display orientation upon rotating the support section 28, such that the tab 344 engages the electronic switch 350. The support section 28 may then be pivoted downward about the orientation adjustment arm 274 to a substantially horizontal landscape configuration, such as illustrated by FIGS. 18 and 19. As mentioned above, this horizontal configuration is particularly well-suited for writing applications using the digitizing pointing device 16. In this horizontal landscape configuration, a rear portion 358 of the support section 28 rests on the orientation adjustment arm 274. The rear portion 358 may comprise a flexible material, such as rubber, to provide a cushioned support interface between the support section 28 and the orientation adjustment arm 274. A foot member, such as a rubber foot, also may extend from a rear portion of the support section 28 to provide a cushioned and relatively high-friction interface for mounting the support section 28 on a desired mounting surface.

As mentioned above with reference to FIGS. 2 and 9, the tablet computer system 10 also may comprise a protective display cover that may be attachable to either the tablet computing device 12 or to the multi-attachable keyboard 14. FIGS. 21-26 are perspective views illustrating an exemplary protective display cover 360, which has reversible coupling structures 362 and 364 that provide different dimensional offsets to accommodate its attachment to the tablet computing device 12 or to the tablet-keyboard assembly 282. Although the protective display cover 360 may comprise any suitable protective material, the illustrated cover 360 comprises a flexible material having a transparent inner window 366 surrounded by an opaque border 368. Accordingly, if the protective display cover 360 is disposed over display screen assembly 22, the user may continue to interact with the tablet computing device 12 through the transparent inner window 366. Alternatively, the protective display cover 360 may be entirely transparent, entirely opaque, or a may have a plurality of the separate transparent windows.

Figure 21:
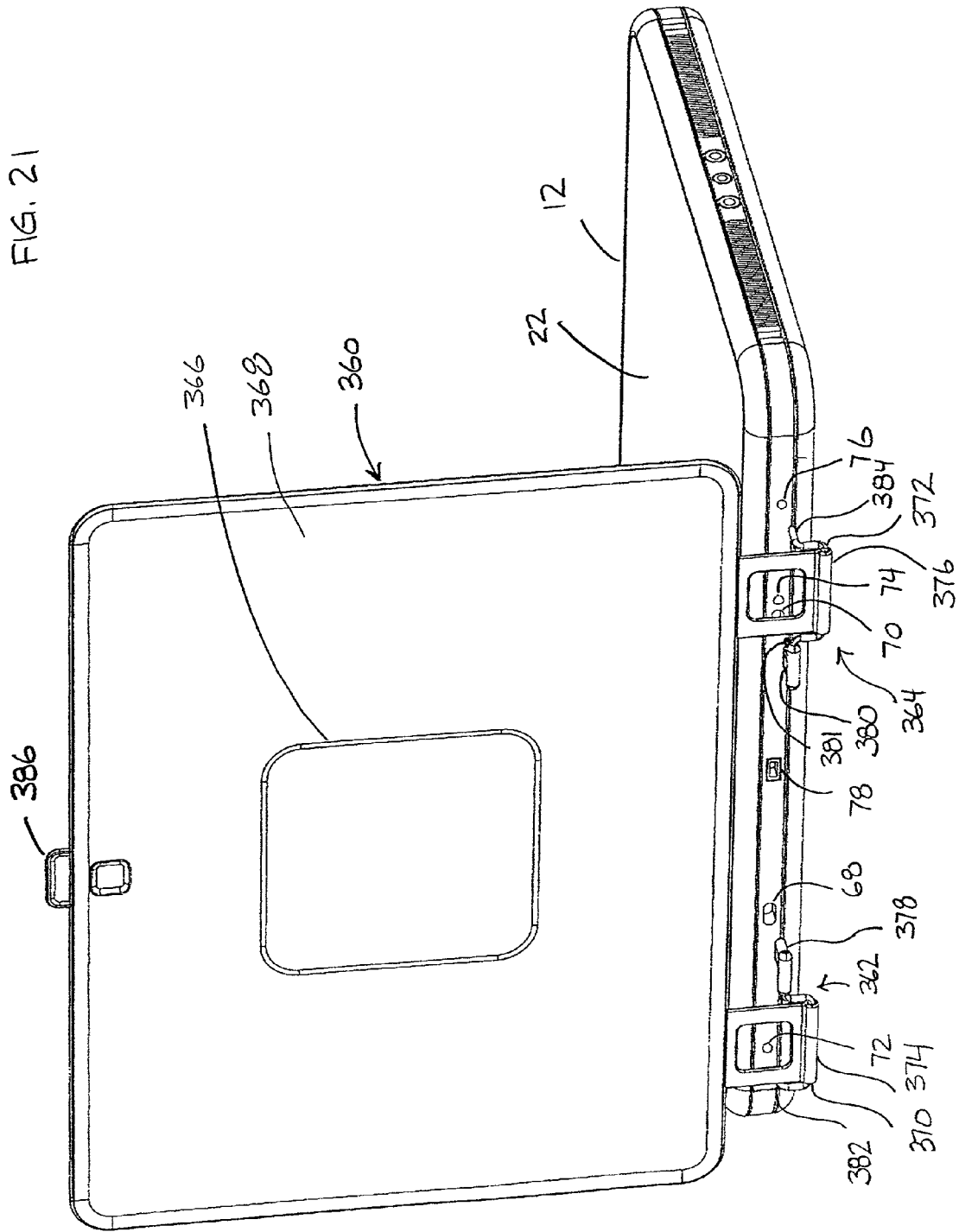
FIG. 21 is a perspective view of a protective display cover exploded from an external device mounting structure on a side of the tablet computing device.
Figure 22:
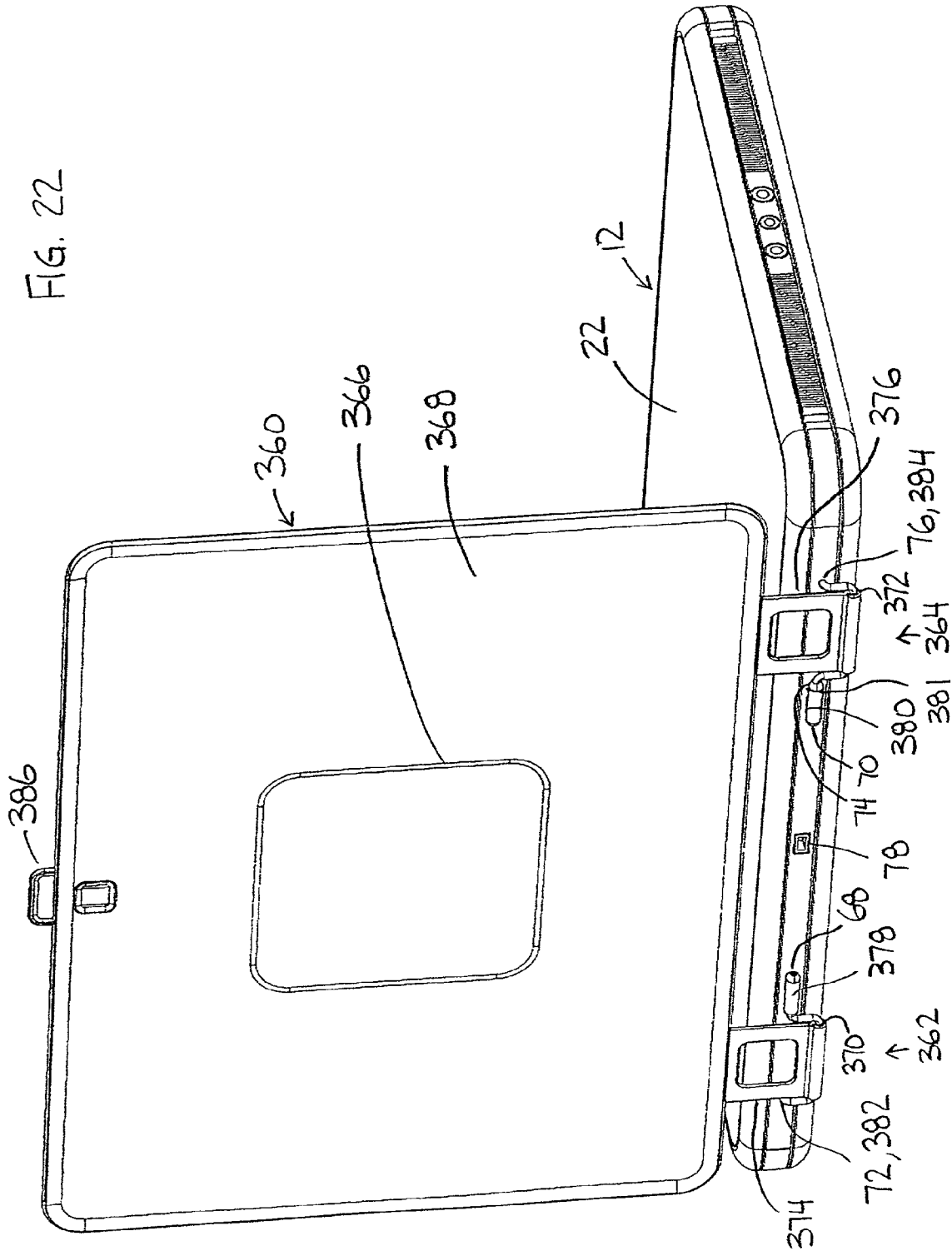
FIG. 22 is a perspective view of the protective display cover releasably mounted to the tablet computing device via reversible coupling structures of the protective display cover.
Figure 23:
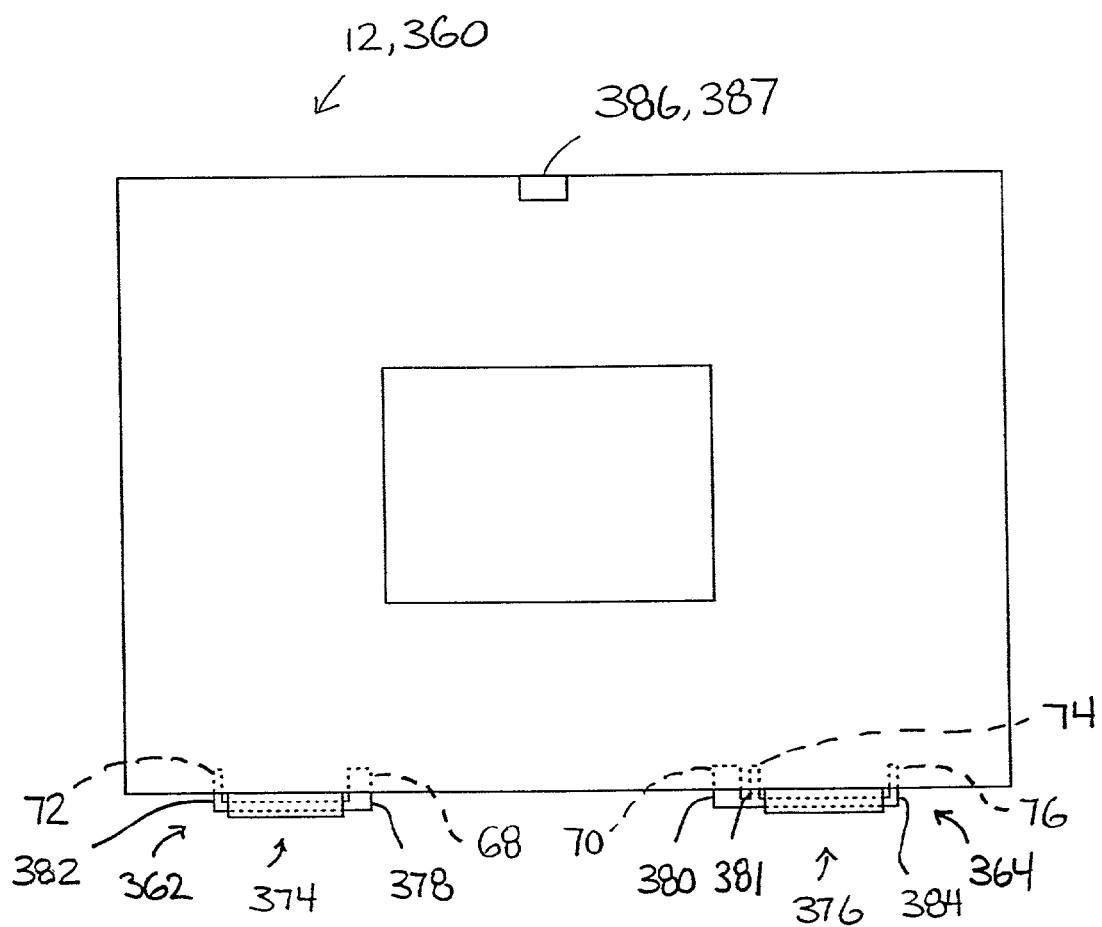
FIG. 23 is a top view of the protective display cover releasably mounted to the tablet computing device.

As illustrated in FIGS. 21-23, the protective display cover 360 may be hingedly coupled to the tablet computing device 12 by releasably coupling the reversible coupling structures 362 and 364 with a side of the tablet computing device 12. The reversible coupling structures 362 and 364 have intermediate U-shaped sections 370 and 372, which are rotatably disposed in hinge structures 374 and 376 of the protective display cover 360, respectively. In this exemplary embodiment, the hinge structures 374 and 376 are also flexible, such that the protective display cover 360 may bend flexibly around the edge of the tablet computing device 12. The reversible coupling structures 362 and 364 also have latch structures 378 and 380 and guide structures 382 and 384, which extend perpendicularly from opposite ends of the intermediate U-shaped sections 370 and 372, respectively. The reversible coupling structure 364 also has an orientation guide structure 381, which is disposed adjacent the latch structure 380 to facilitate proper mounting of the protective display cover 360 with the tablet computing device 12. For engagement with the tablet computing device 12, the intermediate U-shaped sections 370 and 372 are rotated inwardly about the hinge structures 374 and 376, such that the latch structures 378 and 380 and guide structures 381, 382, and 384 are positioned at an intermediate section of the hinge structures 374 and 376, respectively. Accordingly, the intermediate positioning of the latch structures 378 and 380 and guide structures 381, 382, and 384 accommodates the relatively thinner structure of the tablet computing device 12 without the multi-attachable keyboard 14.

The protective display cover 360 is releasably attachable to the tablet computing device 12 by inserting the latch structures 378 and 380 into the external device mount structures 68 and 70, while the guide structures 381, 382, and 384 are inserted into the alignment structures 74, 72, and 76, respectively. FIG. 22 is a perspective view of the protective display cover 360 releasably attached to the tablet computing device 12. As described above with reference to FIG. 2b, the latch structures 378 and 380 are releasable from the external device mount structures 68 and 70 by engaging the external device lock/release mechanism 40, which is disposed on the bottom side 26 of the tablet computing device 12. Again, the latch structures 378 and 380 may comprise asymmetrical hook members or other latch mechanisms (e.g., unidirectional latches) to ensure the proper mount orientation of the protective display cover 360. The arrangement of the alignment structures 72, 74, and 76 relative to the guide structures 382, 381, and 384 also facilitates the proper mount orientation of the protective display cover 360, as illustrated by the top view of FIG. 23. The protective display cover 360 also has a latch structure 386 on an opposite side from the hinge structures 374 and 376 for securing the protective display cover 360 over the display screen assembly 22. The latch structure 386 is releasably coupleable with a mating latch structure 387, which is disposed on the tablet computing device 12.

Figure 24:
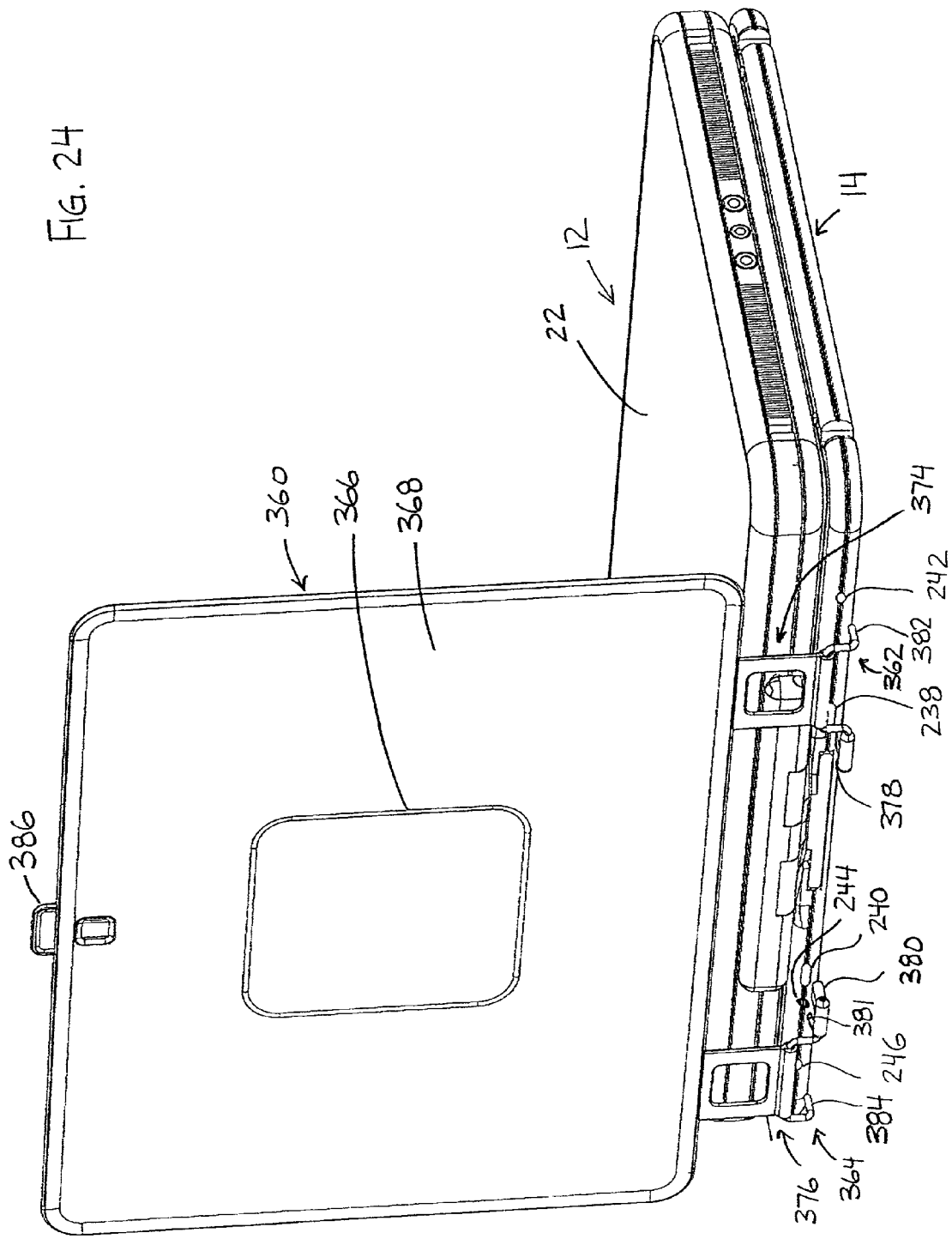
FIG. 24 is a perspective view of the protective display cover exploded from a pair of interlock structures on a side of the multi-attachable keyboard, which is releasably coupled to the tablet computing device in the tablet-keyboard assembly configuration illustrated by FIGS. 11a-11c.

As illustrated by FIGS. 24-26, the protective display cover 360 may be hingedly coupled to the tablet-keyboard assembly 282 by releasably coupling the reversible coupling structures 362 and 364 with a side of the keyboard 14. In this assembled configuration of the tablet computing device 12 and keyboard 14, the external device mount structures 68 and 70 of the tablet computing device 12 are intercoupled with the protruding latch members 184 and 186 of the keyboard 14. Accordingly, the latch structures 378 and 380 and guide structures 381, 382, and 384 of the reversible coupling structures 362 and 364 are coupleable with the keyboard 14 rather than the tablet computing device 12.

For engagement with the keyboard 14 of the tablet-keyboard assembly 282, the protective display cover 360 is flipped over and the intermediate U-shaped sections 370 and 372 are rotated outward about the hinge structures 374 and 376, such that the latch structures 378 and 380 and guide structures 381, 382, and 384 are positioned at an offset from the hinge structures 374 and 376, respectively. Accordingly, the offset positioning of the latch structures 378 and 380 and guide structures 381, 382, and 384 accommodates the relatively thicker structure of the tablet-keyboard assembly 282, which now has the multi-attachable keyboard 14 coupled to the tablet computing device 12. The protective display cover 360 is releasably attachable to the keyboard 14 by inserting the latch structures 378 and 380 into the interlock structures 238 and 240, while the guide structures 381, 382, and 384 are inserted into the guides 244, 242, and 246, respectively.

FIG. 25 is a perspective view of the protective display cover 360 releasably attached to the keyboard 14 of the tablet-keyboard assembly 282. As described above with reference to FIG. 9b, the latch structures 378 and 380 are releasable from the interlock structures 238 and 240 by engaging the external device lock/release mechanism 236, which is disposed on the bottom side of the keyboard 14. Again, the latch structures 378 and 380 may comprise asymmetrical hook members or other latch mechanisms (e.g., unidirectional latches) to ensure the proper mount orientation of the protective display cover 360. The arrangement of the guides 242, 244, and 246 relative to the guide structures 382, 381, and 384 also facilitates the proper mount orientation of the protective display cover 360, as illustrated by the top view of FIG. 26. Again, the latch structure 386 is releasably coupleable with the mating latch structure 387 on the tablet computing device 12 for securing the protective display cover 360 over the display screen assembly 22.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A portable computing system, comprising:
   a tablet computing device, comprising:
   a flat-panel display configured to display an image;
   a single digitizer panel located directly under the flat-panel display such that at least a portion of the single digitizer panel is overlaid by the flat-panel display, wherein the portion of the single digitizer panel that is overlaid by the flat-panel display is configured to receive inputs as a user interacts with the flat-panel display;
   a wirelessly-activated digitizer button disposed outside a perimeter of the flat-panel display, wherein the single digitizer panel is located directly under the wirelessly-activated digitizer button; and
   a frame disposed completely around the perimeter of the flat-panel display, wherein the wirelessly-activated digital button is disposed in the frame.

2. The portable computing system of claim 1, wherein the tablet computing device comprises a processor, a motherboard, and a plurality of computing components.

3. The portable computing system of claim 1, wherein the single digitizer panel comprises a wirelessly-interactive coordinate system.

4. The portable computing system of claim 1, wherein the wirelessly-activated digitizer button is not configured to be activated by physical contact.

5. The portable computing system of claim 1, wherein the wirelessly-activated digitizer button is disposed under a housing surface adjacent the flat-panel display.

6. The system of claim 5, comprising an identification light, wherein the identification light is disposed directly between the digitizer button and the housing surface, and wherein the identification light is activated when the electronic stylus is in close proximity to the digitizer button.

7. The portable computing system of claim 1, wherein the wirelessly-activated digitizer button is disposed under at least one outer layer of the flat-panel display.

8. The portable computing system of claim 1, comprising a plurality of different ones of the wirelessly-activated digitizer button, each one having a different function.

9. The portable computing system of claim 8, wherein each different one of the wirelessly-activated digitizer buttons comprises a different one of the activation signal.

10. The portable computing system of claim 1, wherein the wirelessly-activated digitizer button comprises a peripheral portion of the single digitizer panel.

11. The portable computing system of claim 1, wherein the wireless signaling system comprises a radio frequency (RF) wireless signaling system.

12. The portable computing system of claim 1, comprising:
    an electronic stylus; and
    a wireless signaling system, wherein the wireless signaling system is configured to receive a wireless electronic activation signal from the electronic stylus.

13. The portable computing system of claim 12, wherein the wireless signaling system comprises a non-light wireless signaling system.

14. The portable computing system of claim 12, wherein the wireless signaling system comprises an ultrasonic signal system, an electrostatic signal system, a radio-frequency signal system, an electromagnetic signal system, an electric field signal system, or a combination thereof.

15. The portable computing system of claim 12, comprising an identification light configured to activate when the electronic stylus is in close proximity to the digitizer button, wherein the identification light is disposed directly over the digitizer button.

16. The portable computing system of claim 12, wherein the electronic stylus comprises a stylus button configured to activate the digitizer button upon depression, wherein the stylus button is separate from a tip of the electronic stylus.

17. The portable computing system of claim 1, wherein the wirelessly-activated digitizer button is disposed in a common planar surface with the flat panel display.

* * * * *